(12) United States Patent
Gilb

(10) Patent No.: US 10,733,647 B2
(45) Date of Patent: Aug. 4, 2020

(54) CUMULATIVE EVALUATION AND REVIEW SYSTEMS AND METHODS

(71) Applicant: Brian M. Gilb, Pasadena, CA (US)

(72) Inventor: Brian M. Gilb, Pasadena, CA (US)

(*) Notice: Subject to any disclaimer, the term of this patent is extended or adjusted under 35 U.S.C. 154(b) by 388 days.

(21) Appl. No.: 15/520,381

(22) PCT Filed: Oct. 20, 2015

(86) PCT No.: PCT/US2015/056459
§ 371 (c)(1),
(2) Date: Apr. 19, 2017

(87) PCT Pub. No.: WO2016/064874
PCT Pub. Date: Apr. 28, 2016

(65) Prior Publication Data
US 2017/0308944 A1    Oct. 26, 2017

Related U.S. Application Data

(60) Provisional application No. 62/065,949, filed on Oct. 20, 2014.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0619* (2013.01); *G06Q 30/0282* (2013.01)

(58) Field of Classification Search
CPC ................................. G06Q 30/06–08
USPC ................................. 705/26.1–27.2
See application file for complete search history.

(56) References Cited

U.S. PATENT DOCUMENTS 8,671,056 B1 * 3/2014 Whitney ............ G06Q 30/0631
705/44
2012/0059848 A1 * 3/2012 Krishnamoorthy .... G06Q 30/02
707/770

OTHER PUBLICATIONS

PCT/US2015/056459 International Search Report and Written Opinion dated Jan. 20, 2016, 7 pages.

* cited by examiner

*Primary Examiner* — Ethan D Civan
(74) *Attorney, Agent, or Firm* — Scott H. Davison; Musick Davison LLP

(57) ABSTRACT

The present invention is generally directed to a cumulative rating system for generating accurate and unbiased evaluations of products, performances, and/or services, thereby improving the reliability of information provided to a consumer and improving their purchasing decision.

20 Claims, 19 Drawing Sheets

| CATEGORY | SCORE | | | | |
|---|---|---|---|---|---|
| Category General Description - System host determines the definition of what each category means in general terms that match as close as possible to industry standards to whatever industry the evaluations are taking place in. | | | | | |
| General description of what a one score is | General description for what a score of two and three are. | General description for what a score four and five are | General description for what a score of six and seven are | General description for what a score eight is. | |
| 1 | 2  3 | 4  5 | 6  7 | 8 | |
| Comments - This area is where the evaluator will provide comments to justify their score. This information will then be compiled along with the other category comments to create a thorough and complete written evaluation | | | | | |

CUMULATIVE EVALUATION AND REVIEW SYSTEMS AND METHODS

CROSS REFERENCE TO RELATED APPLICATIONS

This application is a 371 national stage filing of International Application No. PCT/US2015/056459, filed Oct. 20, 2015, which claims the benefit of U.S. provisional patent application No. 62/065,949, filed Oct. 20, 2014, the entire disclosures of which are incorporated herein by reference

FIELD OF THE INVENTION

This invention relates generally to evaluation systems and methods, and, more particularly, to a cumulative rating system for generating accurate and unbiased evaluations of products, performances, and/or services, thereby improving the reliability of information provided to a consumer.

BACKGROUND OF THE INVENTION

Many consumers prefer to take other's opinions into account when making a purchasing decision. Reviews of products and/or services, such as reviews of particular goods (e.g., electronics, clothing, etc.), or a review of the quality of food and/or service at a restaurant, for example, help consumers make informed choices based on the experiences of others. In recent years, online reviews have become an important aspect of the decision making process for many consumers, wherein such reviews have largely become the single most influential aspect in determining consumer buying behavior. In fact, some studies have shown that online consumer reviews of products are the second most trusted form of advertising.

However, current review systems have very little or no means of counteracting biased reviews for content submitted over the internet by users. As a result, online reviews typically suffer from reliability concerns because many websites allow users to submit reviews with little or no verification. In fact, there are many examples of merchants posing as a customer and submitting positive reviews for themselves or submitting negative reviews for their competitors.

Current review system models may be particularly unreliable for certain markets. For example, eBooks and electronic publishing has given rise to a self-publishing industry that is challenging the traditional publishing model. Furthermore, self-publishing companies and online distributors are challenging the status quo of traditional publishing by driving the price of eBooks down and removing barriers to entry for any author willing to publish their own work. Thus, the eBook market is flooded with low-quality work—making it difficult for authors to make a living and for readers to find those authors.

The most significant obstacle for customers in this state of publishing is finding high-quality books to read. Currently, online distributors rely on the "Five Star" rating system to assist customers. However, studies have found that a large portion (almost a third) of all online reviews are faked through individuals or companies hired to produce reviews using "sock puppet" profiles. Accordingly, it is increasingly difficult for consumers to find reliable reviews when deciding on which products to purchase, such as books, for example.

Many consumers prefer to take other's opinions into account when making a purchasing decision. Reviews of products and/or services, such as reviews of particular goods (e.g., electronics, clothing, etc.), or a review of the quality of food and/or service at a restaurant, for example, help consumers make informed choices based on the experiences of others. In recent years, online reviews have become an important aspect of the decision making process for many consumers, wherein such reviews have largely become the single most influential aspect in determining consumer buying behavior. In fact, some studies have shown that online consumer reviews of products are the second most trusted form of advertising.

However, current review systems have very little or no means of counteracting biased reviews for content submitted over the internet by users. As a result, online reviews typically suffer from reliability concerns because many websites allow users to submit reviews with little or no verification. In fact, there are many examples of merchants posing as a customer and submitting positive reviews for themselves or submitting negative reviews for their competitors.

Current review system models may be particularly unreliable for certain markets. For example, Self-Publishing has flooded the eBook market to saturation. In order for authors win the attention of readers, they have resorted to tactics that manipulate the review system by posting reviews on their own work, posting negative reviews about other authors without reading their work, and using fake profiles to generate artificial conversations that lead customers to believe a book is being read more than it actually is.

The most significant obstacle for customers in this state of book publishing is finding high-quality books to read. Currently, online distributors rely on the "Five Star" rating system and algorithms to assist customers. However, studies have found that a large portion (almost a third) of all online reviews are faked through individuals or companies hired to produce reviews using "sock puppet" profiles, which are created by reviewers who are incentivized to provide fictitious reviews (See Jindal et al., "Opinion Spam and Analysis", *Proceedings of First ACM International Conference on Web Search and Data Mining* (WSDM-2008), Feb. 11-12, 2008, Stanford University, Stanford, Calif., USA). Accordingly, it is increasingly difficult for consumers to find reliable information from customer reviews when deciding on which products to purchase, such as books, for example.

BRIEF SUMMARY OF THE INVENTION

The present invention relates to a Cumulative Rating System (CRS) for generating accurate and unbiased evaluations of products, performances, and/or services, thereby improving the reliability of information provided to a consumer and improving their purchasing decisions. In the embodiments described herein, the CRS is adapted to be used in the book publishing industry, particularly for the evaluation of eBooks.

However, it should be noted that the CRS of the present disclosure is configured to be compatible with other industries in providing evaluation or review of a variety of products, services, and/or performance of businesses, and need not be limited to the book publishing industry. For example, the CRS is configured to be used in providing evaluation of a wide variety of retail products, evaluation of a variety of businesses that provide a service (e.g., restaurant preparing and serving food and drink, beauty salon providing cosmetic services, retail store selling consumer products, etc.), and evaluation of performance of businesses/individuals providing a service (e.g., performance of tradesperson, such as a plumber or electrician, performance of sales staff at a business, etc.). Furthermore, the CRS is configured to be used in providing evaluations of products and/or services that are creative, artistic in nature, or require some type of performance, including, but not limited to, restaurants, hotels, realtors, art and design, movies and film, schools and universities, contractors, musical productions, musical bands, sports equipment, food products, bars, dance clubs, motor vehicles, cleaning products, etc.

According to one aspect, the CRS is an evaluation/review system that provides businesses, individuals, industries, or entities with an accurate and unbiased evaluation of their product, performance, or service and to further provide such unbiased evaluation to consumers to assist in their purchasing decision. Generally, the CRS is configured to take qualitative information in the form of evaluations/reviews and translate such information it into quantitative information by use of uniformed review criteria so as to provide customers with more accurate reviews to help them make a purchase decision.

The CRS may generally be embodied on any known internet-based computing system, or other external computing configuration in which there are one or more remote servers networked to allow a centralized data storage and online access to such data. For example, in one embodiment, the CRS may be embodied on a cloud-based service, for example, and provide an interface such that one or more entities may access the system and interact with the interface so as to allow an entity to review and select different evaluation/review options provided by the system. The entities may include, for example, a business, individual, industry, or entity that seeks out an evaluation of their product, performance, or service.

A requesting entity (also referred to as "requesting client") can select to have any combination of reviews for their product, service, process or business by making a transaction with an administrator (also referred to as "industry user") in exchange for evaluations. The industry user is a business or other entity with administrator access to a particular segment within the CRS and essentially acts as the intermediary between the requesting entity and the one or more registered reviewers. By providing a requesting client with the ability to have any combination of reviews for their product, service, process or business gives them power over how customers perceive their business or products by competing with others in a fair environment with regulated reviews. The CRS is configurable enough to adjust to any combination of orders, requests, prices, or individuals requesting orders.

The system is configured to gather evaluation/review requests from one or more entities accessing the cloud-based service. The system is further configured to utilize one or more registered reviewers to provide an evaluation/review of the requested product, performance, and/or service. The registered users may generally include individuals who are screened by the administrator for qualifications and credentials so as to ensure that a registered reviewer is qualified to provide an accurate and unbiased evaluation/review.

The registered reviewers are able to access the system via the cloud-based service and further access a cumulative evaluation form which includes a set of questions requiring the reviewer's input so as to provide an evaluation of the requested product, performance, or service as dictated by the requesting entity. The system is further configured to receive completed evaluations from one or more registered reviewers and analyze the completed evaluation/review data to provide an overall rating of the requested product, performance, or service. In some embodiments, the system is configured to compare completed evaluation/review data from a first registered reviewer with other completed evaluation/review data of the same product, performance, or service from other registered reviewers so as to generate an overall average rating for any given product, performance, or service so as to provide a more accurate review.

The CRS is configured to then present ratings to one or more customers via the cloud-based service, thereby providing accurate and reliable evaluation for any given product, performance, or service to aid the consumer during the buying process. Consumers may further have access to additional information related to any given review, such as individual profiles of one or more registered reviewers, so as to provide improved transparency into the review process as well as the experience of each reviewer to further provide an enhanced sense of reliability in any given review.

The system of the present invention focuses on the idea that the collective opinion of a group is more accurate than the individual decision of an expert. See Surowiecki, J. (2004). *The Wisdom of Crowds*. DoubleDay—Division of Random House. Generally, in order for this concept to be true, a group must meet four conditions: Diversity—each person should have some private information, even if it's just an eccentric interpretation of the known facts; Independence—people's opinions are not determined by the opinions of others around them; Decentralization—people are able to specialize and draw on local knowledge; and Aggregation—some mechanism exists for turning private judgments into a collective decision. The CRS embodies all four conditions in order to make the final, overarching value of a product, performance, or service a definitive mark as to its value in comparison to others.

The system of the present invention is adaptable to any industry and can be plugged into online platforms and/or cloud-based services, and/or external computing devices/servers so as to display ratings in a new and useful manner. The system is simple to use for the system administrator, the reviewers, and customers. Furthermore, the CRS is able to be implemented across several different industries and change the way in which customers interpret reviews, thereby defeating the current review-system manipulation tactics that exist on the Internet.

With respect to the eBook publishing industry, the CRS is particularly compatible with eBooks, and is configured to provide a means for providing consumers with a more accurate and unbiased review of the quality of a story. The system is configured to make evaluating eBooks unbiased, organized, and easy to understand. The system is less prone to manipulation tactics that may be used with the "Five Star" system that most self-publishing and online distributors use.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

BRIEF DESCRIPTION OF THE DRAWINGS

FIG. 12 illustrates an exemplary cumulative evaluation form template.

DETAILED DESCRIPTION OF THE INVENTION

Figure 1:
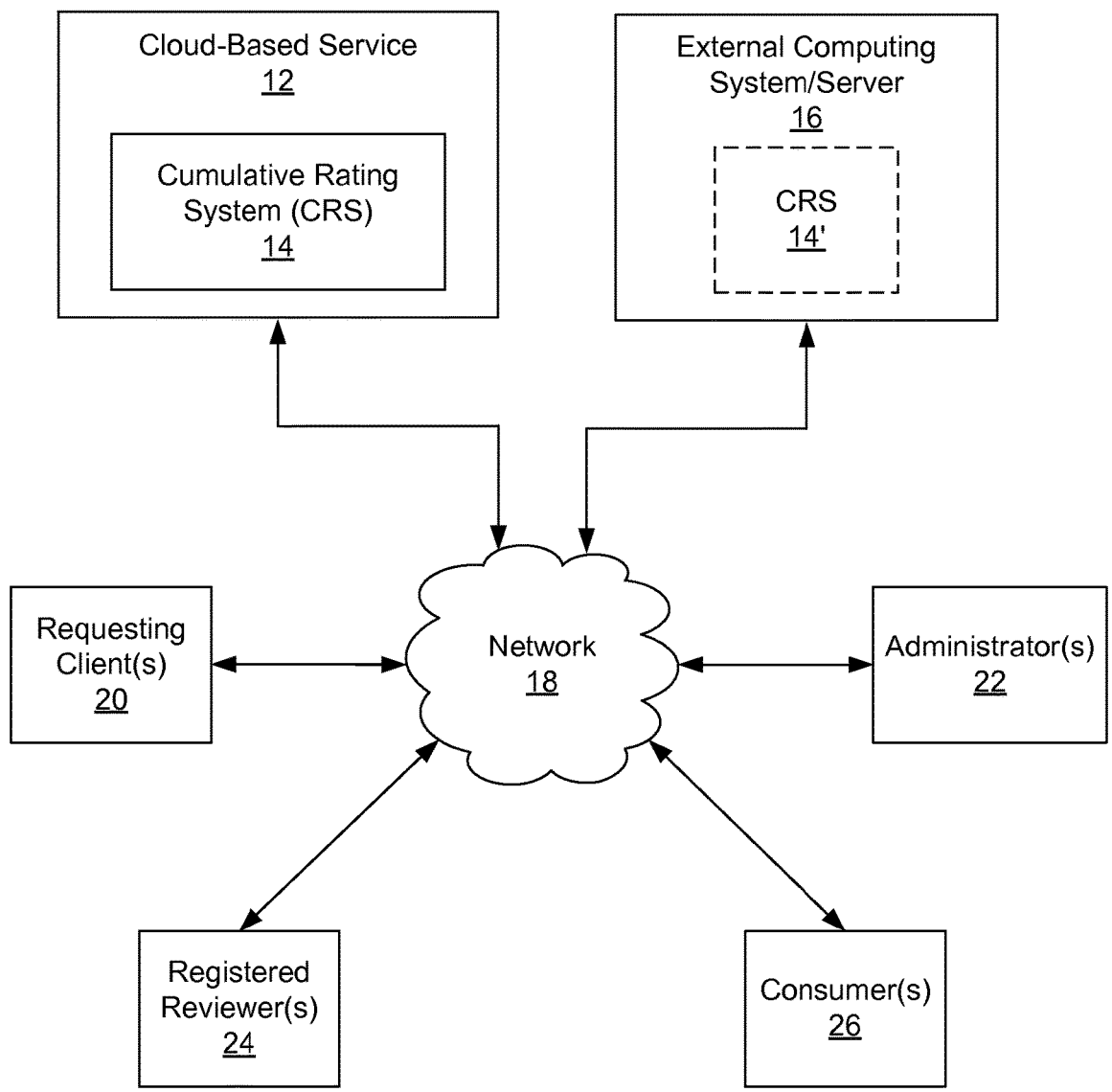
FIG. 1 is a block diagram illustrating one embodiment of an exemplary system for providing accurate and unbiased evaluations of products, performances, and/or services to improve the reliability of information provided to a consumer.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment. It should be noted that the terms "evaluation" and "review" are used interchangeably throughout this specification and should be treated as having similar meaning with respect to the subject matter of the present disclosure. It should be further noted that the terms "customer" and "consumer" are used interchangeably throughout this specification and should be treated as having similar meaning with respect to the subject matter of the present disclosure.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment. It should be noted that the terms "evaluation" and "review" are used interchangeably throughout this specification and should be treated as having similar meaning with respect to the subject matter of the present disclosure. It should be further noted that the terms "customer" and "consumer" are used interchangeably throughout this specification and should be treated as having similar meaning with respect to the subject matter of the present disclosure.

By way of overview, the present invention is generally directed to a cumulative rating system (CRS) for generating accurate and unbiased evaluations of products, performances, and/or services, thereby improving the reliability of information provided to a consumer and improving their purchasing decisions. Generally, the CRS is configured to take qualitative information in the form of evaluations/reviews and translate such information it into quantitative information so as to provide customers with more accurate reviews to help them make a purchase decision.

The CRS may generally be embodied on an internet-based computing system, such as a cloud-based service, for example, and provide an interface such that one or more entities may access the system and interact with the interface so as to allow an entity to review and select different evaluation/review options provided by the system. The entities may include, for example, a business, individual, industry, or entity that seeks out an evaluation of their product, performance, or service. In the embodiments described herein, the CRS is adapted to be used in the book publishing industry, particularly for the evaluation of eBooks. However, it should be noted that the CRS of the present disclosure is configured to be compatible with other industries in providing evaluation or review of a variety of products, services, and/or performance of businesses For example, the CRS is configured to be used in providing evaluation of products and services that are creative, artistic in nature, or require some type of performance, including, but not limited to, restaurants, hotels, relators, art and design, movies and film, schools and universities, contractors, musical productions, musical bands, sports equipment, food products, bars, dance clubs, motor vehicles, cleaning products, etc.

The CRS is configured to gather evaluation/review requests from one or more entities accessing the cloud-based service. The system is further configured to utilize one or more registered reviewers to provide an evaluation/review of the requested product, performance, and/or service. The registered users may generally include individuals who are screened by an administrator (also referred to as "industry user") for qualifications and credentials so as to ensure that a registered user is qualified to provide an accurate and unbiased evaluation/review. The industry user is a business or other entity with administrator access to a particular segment within the CRS and essentially acts as the intermediary between the requesting entity and the one or more registered reviewers.

The registered reviewers are able to access the system via the cloud-based service and further access a cumulative evaluation form which includes a set of questions requiring the reviewer's input so as to provide an evaluation of the requested product, performance, or service as dictated by the requesting entity. The system is further configured to receive completed evaluations from one or more registered reviewers and analyze the completed evaluation/review data to provide an overall numerical or general rating of the requested product, performance, or service. In some embodiments, the system is configured to compare completed evaluation/review data from a first registered reviewer with other completed evaluation/review data of the same product, performance, or service from other registered reviewers so as to generate an overall average rating for any given product, performance, or service so as to provide a more accurate review. The CRS is configured to then present ratings to one or more customers via the cloud-based service, thereby providing accurate and reliable evaluation for any given product, performance, or service to aid the consumer during the buying process.

FIG. 1 is a block diagram illustrating one embodiment of an exemplary system 10 for providing accurate and unbiased evaluations of products, performances, and/or services to improve the reliability of information provided to a consumer. As shown, the system 10 includes a cloud-based service 12 configured to communicate and share data with one or more requesting clients 20, one or more administrators 22 (also referred to herein as "industry users" 22), one or more registered reviewers 24, and one or more consumers 26 over a network 18.

As shown, the cloud-based service 12 may include a cumulative evaluation system (CRS) 14 consistent with the present disclosure. As described in greater detail herein, the CRS 14 is configured to generate accurate and unbiased evaluations of products, performances, and/or services of a requesting entity 20 and further provide the evaluations to a consumer 26 to improve their purchasing decisions. In the illustrated embodiment, the CRS 14 is embodied in the cloud-based service 12. However, it should be noted that the CRS 14 may be embodied in an external computing system/server 16, as indicated by CRS 14'. In any event, the CRS 14 may be accessed by any one of the requesting clients 20, administrators 22, registered reviewers 24, and consumers via the network 18.

The one or more requesting clients 20 may include, for example, a business, individual, industry, or entity that seeks out an evaluation of their product, performance, or service. The one or more administrators 22 (industry users) may include, for example, a business with administrator access to a particular segment within the CRS 14, wherein the administrator 22 generally acts as the intermediary between the requesting client 20 and one or more registered reviewers 24 who will be conducting the evaluations of the requested product, performance, or service. The one or more registered reviewers 24 generally include individuals who are screened by an administrator 22 for qualifications and credentials so as to ensure that a registered user is qualified to provide an accurate and unbiased evaluation/review. The one or more consumers 26 are those individuals who are able to view informational data in the form of product, performance, or service ratings based on completed evaluations by the registered reviewers 24.

As previously described, the CRS 14 may be embodied on the cloud-based service 12 and be accessed by and share data that the requesting clients 20, administrators 22, registered reviewers 24, and consumers 26 via the network 18. The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), other networks capable of carrying data, and combinations thereof. In some embodiments, network 16 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

Accordingly, at least one of the requesting clients 20, administrators 22, registered reviewers 24, and consumers 26 may be able to access and share data with the CRS 14 via any computing device capable of communicating with the cloud-based service 12 and/or other computing devices over the network 18. For example, the computing device may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

The CRS 14 is configured to gather evaluation/review requests from one or more requesting clients 20 accessing the CRS 14 via the cloud-based service 12. The CRS 14 is further configured to utilize one or more registered reviewers 24 to provide an evaluation/review of the requested product, performance, and/or service. The registered reviewers 24 are able to access the CRS 14 via the cloud-based service 12 and further access a cumulative evaluation form which includes a set of questions requiring the reviewer's input so as to provide an evaluation of the requested product, performance, or service as dictated by the requesting client 20. Upon receiving completed evaluations from one or more registered reviewers 24, the CRS 14 is configured to analyze the completed evaluation/review data to provide an overall rating of the requested product, performance, or service. The CRS 14 is then configured to present ratings to one or more customers 26 via the cloud-based service, thereby providing accurate and reliable evaluation for any given product, performance, or service to aid the consumer during the buying process.

In the embodiments described herein, the CRS 14 is configured to be used in the book distribution industry, particularly for the evaluation of eBooks. However, it should be noted that the CRS 14 of the present disclosure is configured to be compatible with other industries in providing evaluation or review of a variety of products, services, and/or performance of businesses For example, the CRS 14 is configured to be used in providing evaluation of products and services that are creative, artistic in nature, or require some type of performance, including, but not limited to, restaurants, hotels, relators, art and design, movies and film, schools and universities, contractors, musical productions, musical bands, sports equipment, food products, bars, dance clubs, motor vehicles, cleaning products, etc.

Figure 2:
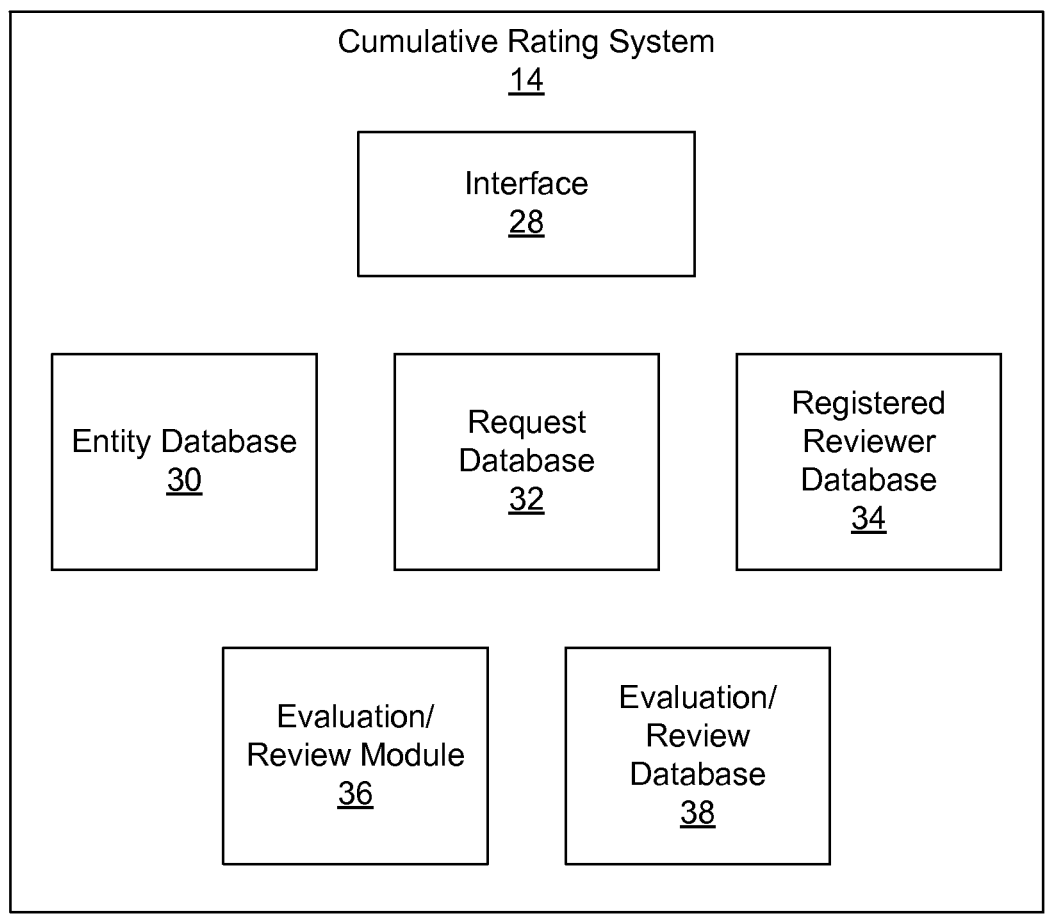
FIG. 2 is a block diagram illustrating the cumulative rating system (CRS) of FIG. 1 in greater detail.
Figure 3:
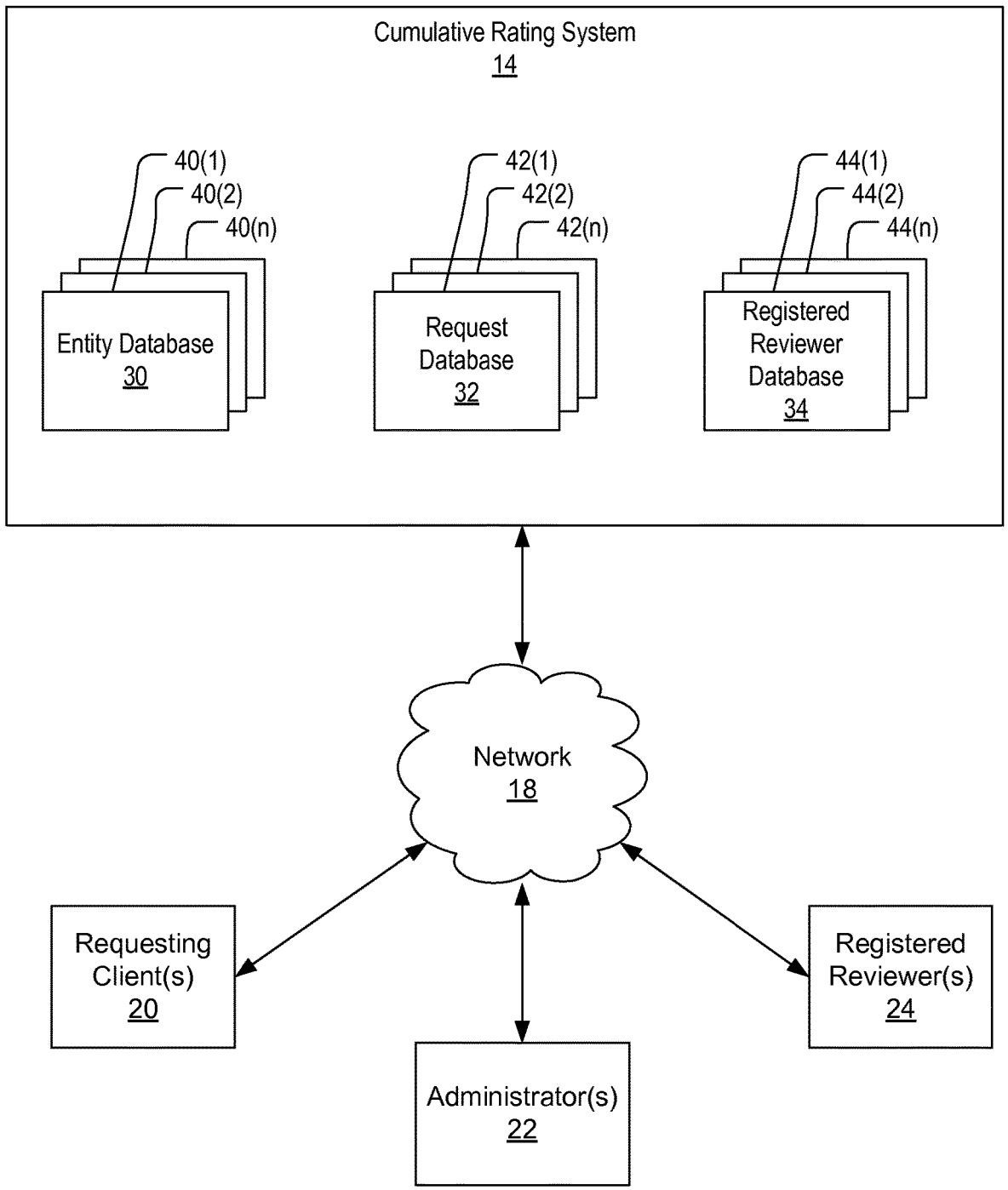
FIG. 3 is a block diagram illustrating the CRS of FIG. 2 in greater detail.

FIGS. 2 and 3 are block diagrams illustrating the cumulative rating system (CRS) 14 of FIG. 1 in greater detail. As shown, the CRS 14 includes an interface 28, an entity database 30, a request database 32, a registered reviewer database 34, an evaluation/review module 36, and an evaluation/review database 38. The interface 28 may generally allow the requesting clients 20, administrators 22, registered reviewers 24, and consumers 26 to access and share data with one or more components of the CRS 14. For example, upon accessing the CRS 14 on the cloud-based service 12, the interface 28 may allow a requesting client 20, such as an author, to access a entity database 30 so as to create a profile (profiles 40(1)-40(n)), which may include the conventional input (e.g., name, address, billing information, background information, preferences, products, performances, services to be evaluated, etc.) and further access a request database 32 to select from a variety of evaluation options for their desired product, performance, or service. Upon selecting the specific evaluation parameters, the request database 32 creates a profile (profiles 42(1)-42(n)) including the requested product, performance, or service and the associated evaluation parameters.

In the following examples, the requesting client 20 orders one or more books evaluations. Accordingly, upon accessing CRS 14, the client 20 is able to create a profile within the entity database 30 and then further access the request database 32 so as to select from a variety of different options for the evaluation. For example, the requesting client 20 has the option to pick different types of packages of reviews that are designated by the administrator 22. Accordingly, the administrator 22 has the ability to package, price, and market evaluations/reviews that best fits their marketing plan or demand in the industry. Additionally, this concept further provides the requesting client 20 with the flexibility to choose reviews that fit their budget and desires.

In one embodiment, in order for the CRS 14 to perform efficiently, there should be a minimum of reviews per product. In one embodiment, the minimum amount of reviews may be three reviews so as to ensure an accurate comparison rating. However, it should be noted that any number of reviews may be sufficient for any given product, service, and/or performance and the minimum not be limited to three reviews. However, as generally understood, the more reviews performed and collected for per a single product will generally result in the generation of a more accurate overall rating of such a product. For example, an author must purchase a minimum of three reviews for their book in order for the system to show what rating their book is. As the CRS 14 limits the absolute minimum amount of reviews available, the administrator 22 can select to have a maximum amount of reviews a requesting client 20 can order at one time or overall, thereby allowing the administrator 22 to regulate the ratings to ensure accuracy across the CRS 14 for all customers. The CRS 14 is capable of setting different maximums and minimums based off of specialty or subspecialty, giving the requesting client 20 several different options based on their product.

One of the main facets of the CRS 14 is that is does not allow the requesting client 20 to select specific reviewers to conduct reviews of their product. This prevents the requesting client 20 from influencing any single registered reviewers 24 opinion. However, the requesting client 20 is able to select the general type of reviewer based on how many reviews the registered reviewer 24 has conducted. As described in greater detail herein, individual profiles of each registered reviewer 24 (profiles 44(1)-44(n)) are contained with the registered reviewer database 34, such that characteristics (e.g., experience level, specialty, subspecialty, number of reviews performed, etc.) can be viewed by the requesting client 20, as well as the consumer 26. The purpose of this is that registered reviewers 24 with more reviews in their profile carry more weight than those with fewer evaluations.

The CRS 14 is configured to provide a requesting client 20 with different levels of registered reviewer experience to choose from. Bottom level reviewers have the least amount of reviews and experience in the CRS 14, whereas the top level reviewers have the most amount of reviews. The administrator 22 can elect how many reviews constitute a level, which will affect a registered reviewer's standing in the CRS 14. For example, if used for eBooks, a level 1 reviewer will have read and evaluated between 0 books to 25 books that are in the system. whereas a level 4 reviewer will have over 75 books in their profile. It is at this stage in the request/order process where the requesting client 20 can see how much they are going to be charged for their evaluations. Here, the administrator 22 can designate how much particular reviews from each level will cost. The administrator 22 can also use the CRS 14 to calculate different discounts and pricing to appeal to the requesting client 20.

For example, if the administrator 22 is an eBook distributor and has registered reviewers 24 that read and evaluate the eBooks, a level 1 review will cost $65 and a level 4 will cost $150. If a requesting client 20 elects to have all Level 4's as their reviewers, they will be offered a 10% discount.

It will take time before each administrator 22 has several high-level reviewers in the system. Therefore, the CRS 14 is configured to help the requesting client 20 by showing what type of level reviewers are available and how many. Additionally, the CRS 14 can be adapted so that the administrator 22 is not overloading its registered reviewers 24 with work and can cap their queue if they so desired. For example, using the eBook distributor example again, that the administrator 22 may have seven level 4 reviewers, but three are capped out in their queue. The CRS 14 will only display four Level 4 reviewers for the requesting client 20 to select.

To reduce manipulation, the CRS 14 is further optimized to limit how many reviews a requesting client 20 can purchase for each level based on what is available. For example, if 10 Level 4 reviewers are available, the administrator 22 can elect to have the requesting client 20 only order up to 3 Level 4 reviewers. This feature may be particularly useful when the administrator 20 is just starting to populate the levels with reviewers 24. Additionally, this prevents requesting clients 20 from buying all reviews from a level and knowing exactly who will be doing their reviews.

The request database 32 further provides a requesting client 20 with the ability to select when the reviews will be released (e.g., published and available to consumers 26). The purpose of this is to allow a requesting client 20 to synch the release of the reviews with a marketing plan they are employing for their product. It also allows for the CRS 14 to adapt the queue for the registered reviewers 24 to allow the maximum amount of reviews for them to conduct over a period of time. For example, if an author is going to publish their book, they can give the manuscript to the administrator 22 and have the evaluations all released on the date the book is made public, or they can release three reviews every quarter to have a steady stream of content to share on their author platforms.

The CRS 14 is configured to gather evaluation/review requests from the requesting client 20 and provide one or more registered reviewers 24 with a cumulative evaluation form which includes a set of questions requiring a reviewer's input so as to provide an evaluation of the requested product, performance, or service. In some embodiments, the registered reviewers 24 may be randomly assigned. However, in other embodiments, the registered reviewers 24 may be selected and assigned an evaluation/review request based on their individual characteristics, such as experience level (Level 1 through Level 4) and/or specialty. The evaluation/review module 36 of the CRS 14 is configured to further receive completed cumulative evaluation forms and analyze the evaluation data to provide an overall rating of the product, performance, or service requested for evaluation. The evaluation/review module 36 may include custom, proprietary, known and/or after-developed statistical analysis code (or instruction sets), hardware, and/or firmware that are generally well-defined and operable to receive one or more sets of data and identify, at least to a certain extent, a pattern related to an accurate assessment of the overall rating of a product, performance, or service.

In some embodiments, the evaluation/review module 36 is configured to compare completed evaluation/review data from one registered reviewer with other completed evaluation/review data of the same product, performance, or service from other registered reviewers so as to generate an overall average rating. The completed evaluation data and the analyzed evaluation data may then be stored in an evaluation/review database 38. The CRS 14 is then configured to present ratings to one or more customers 26 via the cloud-based service, specifically allowing consumer 26 to access the evaluation/review database 38 and view ratings, as well as completed evaluation data. Consumers 26 may further have access to at least the registered reviewer database 34 so as to view profiles of individual registered reviewers 24 so as to provide improved transparency into the review process as well as the experience of each reviewer to further provide an enhanced sense of reliability in any given review.

Figure 4:
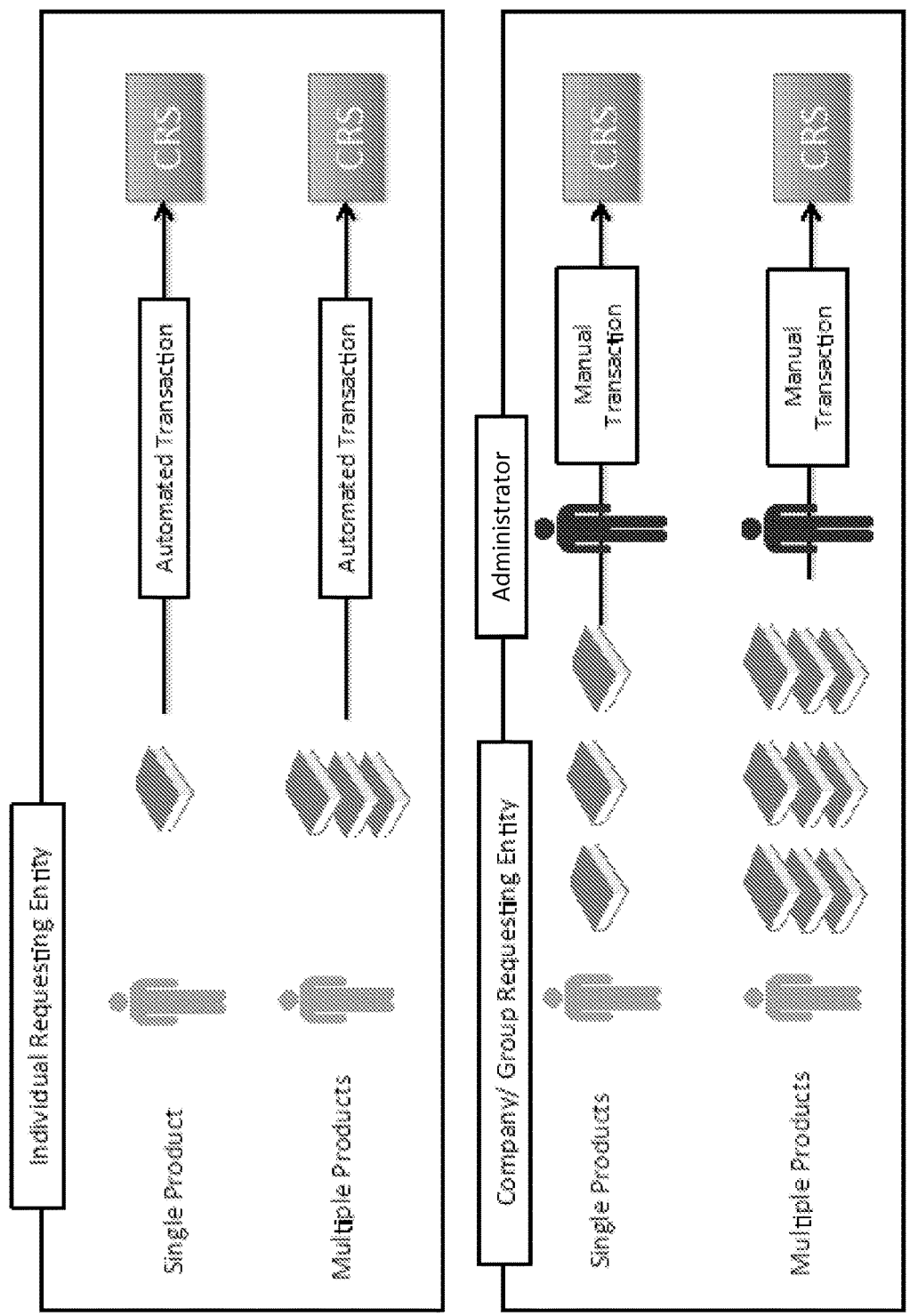
FIG. 4 is a block diagram illustrating requesting of an evaluation of single products versus multiple products with the CRS.

FIG. 4 is a block diagram illustrating requesting of an evaluation of single products versus multiple products with the CRS 14. Requesting clients 20 can request reviews from the CRS 14 via the administrator 22 through a website, application, or other means (e.g., cloud-based service 12). Requesting clients 20 can select to have any combination of reviews for their product, service, process or business by making a transaction with the administrator 22 in exchange for evaluations. Doing so gives them power over how customers perceive their business or products by competing with others in a fair environment with regulated reviews. The CRS is configurable enough to adjust to any combination of orders, requests, prices, or individuals requesting orders.

The CRS 14 is designed to be configurable to both individuals and organized groups or businesses. In some ways, the transitions for reviews will be simple. In other ways, it will be complex. The simplest form of a review through the CRS is an individual requesting client 20 with a single product or service they want reviewed. The CRS 14 can easily be customized by the administrator 22 to process these small transactions automatically. For example, a self-published author may wish to get their new eBook reviewed in order to increase their visibility of their work. They can do a one-time transaction with the administrator 22 via the CRS 14. This small transaction is an automated transaction made through the CRS 14, which is compatible with various merchant software and ecommerce platforms.

The next level of complexity is an individual having several products to be reviewed. The CRS 14 can be adapted to take review orders for several products from one individual by maintaining their profile within the system, allowing the requesting client 20 to make their entire order at once or return to input more reviews for the same or different products over time. For example, an author has a three-part series that they want to have reviewed. However, they choose to have one book reviewed only to start, then the following books in six month intervals. This will allow the requesting client to be a returning customer. Again, because this is a relatively small and simple transaction, the CRS 14 is optimized for automatic transactions with e-commerce or online merchant software. It should be noted that transactions may also occur in the traditional in-person transaction in addition, or alternatively, to online automatic transactions.

The complexity of this system rises when companies or organizations seek to order reviews of their product. At this stage, the administrator 22 will need to interact with each requesting client 20 personally, but will first gather information from them to create a quote. For example, a small publishing company has 5 books with different authors that want to enter the system. In order to verify that the publishing company is legitimate and owns the right to distribute, the administrator 22 will gather initial information from the company then verify their credentials. This will also allow the administrator 22 to establish a contract with the requesting client 20. Due to the increasingly complex nature of these types of transactions, the administrator 22 can set a cut off point for these transactions to be made automatically in the system, and when a requesting client 20 needs to contact them personally for a quote and to handle other logistics.

The last and most complex of these will be when a large business or organization requests to have several of their products reviewed. The CRS 14 is configured to handle hundreds of products, as well as the dozens of reviews associated with each product. Due to the amount of revenue that could be involved for the administrator 22, the CRS 14 is designed for the administrator 22 to regulate this contract from the back end of the CRS and help meet the requesting client's 20 needs to generate and store contracts, adjust pricing, and regulate a requesting client's 20 entire portfolio of reviews that are being conducted.

For example, one of the "Big Six" publishing companies wants to enter into contract with the administrator 22. They have hundreds of authors and may request a rather large number of reviewers per book. The administrator 22 can use mechanisms and procedures in the CRS 14 to handle all of these requests to serve the large company, and even designate system managers to handle their portfolio, as described in greater detail herein. This is a very large transaction that cannot be automated, or at least punched in by the requesting client 20. This stage requires that the administrator 22 handle the majority of these dealings and logistics offline and punch them into the CRS 14 manually.

Figure 5:
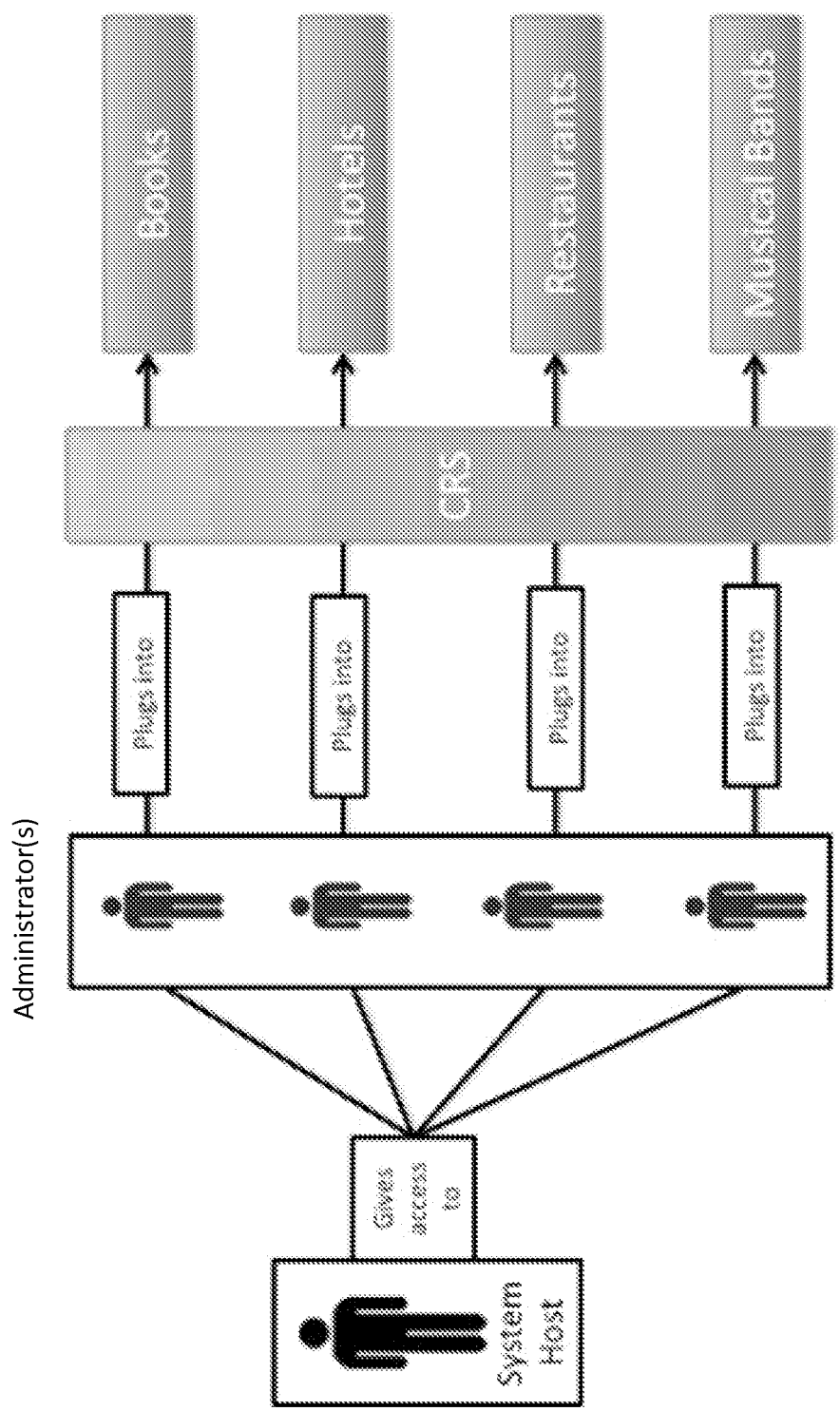
FIG. 5 is a block diagram illustrating one embodiment of hierarchy of the CRS.

FIG. 5 is a block diagram illustrating one embodiment of hierarchy of the CRS 14. As generally understood, a system host may be responsible for the CRS 14. The system host may be thought of as the owner of the CRS 14 and is able to license the use of the CRS 14 to other business or companies that wish to implement the CRS 14 for their own evaluations/reviews or to solicit their services and the use of CRS 14 by other requesting clients 20. The system host may generally be responsible for the upkeep and ongoing maintenance of the CRS 14, including the information technology (IT) and other aspects (e.g., servers, software updates, etc.) and is further responsible for the hosting of the CRS 14.

The licensees of the CRS 14 may be treated as administrators 22, and will have access to the CRS 14 and be able to make the CRS 14 configurable to anything they wish to evaluate. For example, the system host is able to grant access to CRS 14 for administrators 22 who want to utilize the system for their own websites, businesses, or established companies. The system host will act as the technical support for issues that the administrator 22 may have and will get feedback from the administrator 22 for how to improve the system and optimize it for their own use. From there, the administrator 22 can utilize the system in any way they see fit for serving their customers and the requesting clients 20.

Figure 6:
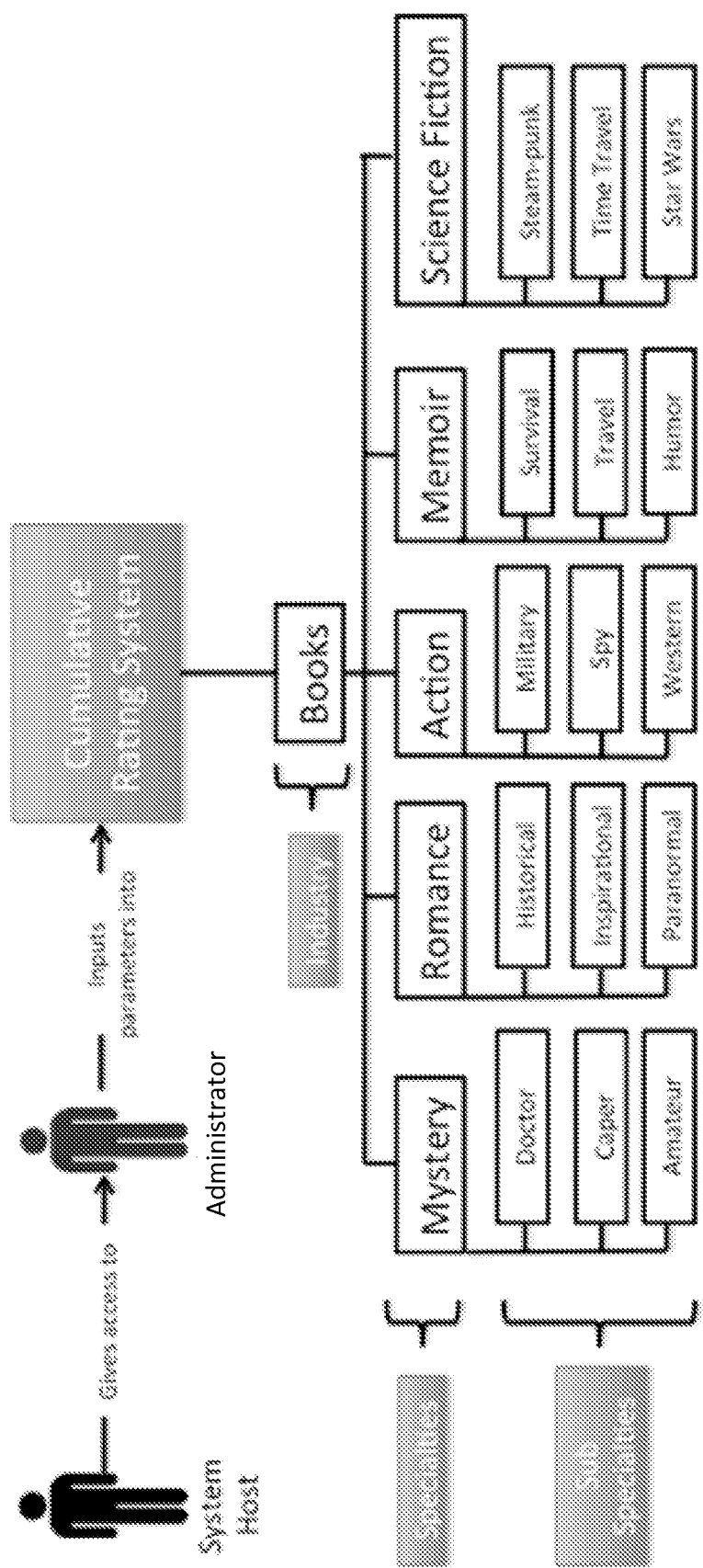
FIG. 6 is a block diagram illustrating customization of one or more parameters of the CRS so as to accommodate different products, performances, and/or services.

FIG. 6 is a block diagram illustrating customization of one or more parameters of the CRS 14 so as to accommodate different products, performances, and/or services. The CRS 14 is designed to accommodate different types of products. Obviously, each product has different models, designs, sets, or other customizations that make it unique but still similar for comparison with other products. Therefore, the CRS 14 can be optimized to handle different specialties, sub specialties, and sub sets of any type of product the administrator 22 needs evaluated.

Administrators 22 will be given authorization to adapt the specialties and subspecialties to the particular industry they are conducting evaluations for. For example, if an online book seller wants to use this for their website, they will designate the specialties for different types of books (genres). The system can go further by delineating sub specialties (sub-genres) and further down to sub-types if needed. As shown in FIG. 6, for example, an administrator 22 can customize the CRS 14 so as to include two levels of delineation for the rating of books (by specialty and sub-specialty). The CRS 14 may be configured to delineate for multiple levels (e.g., 10 levels or more).

Figure 7:
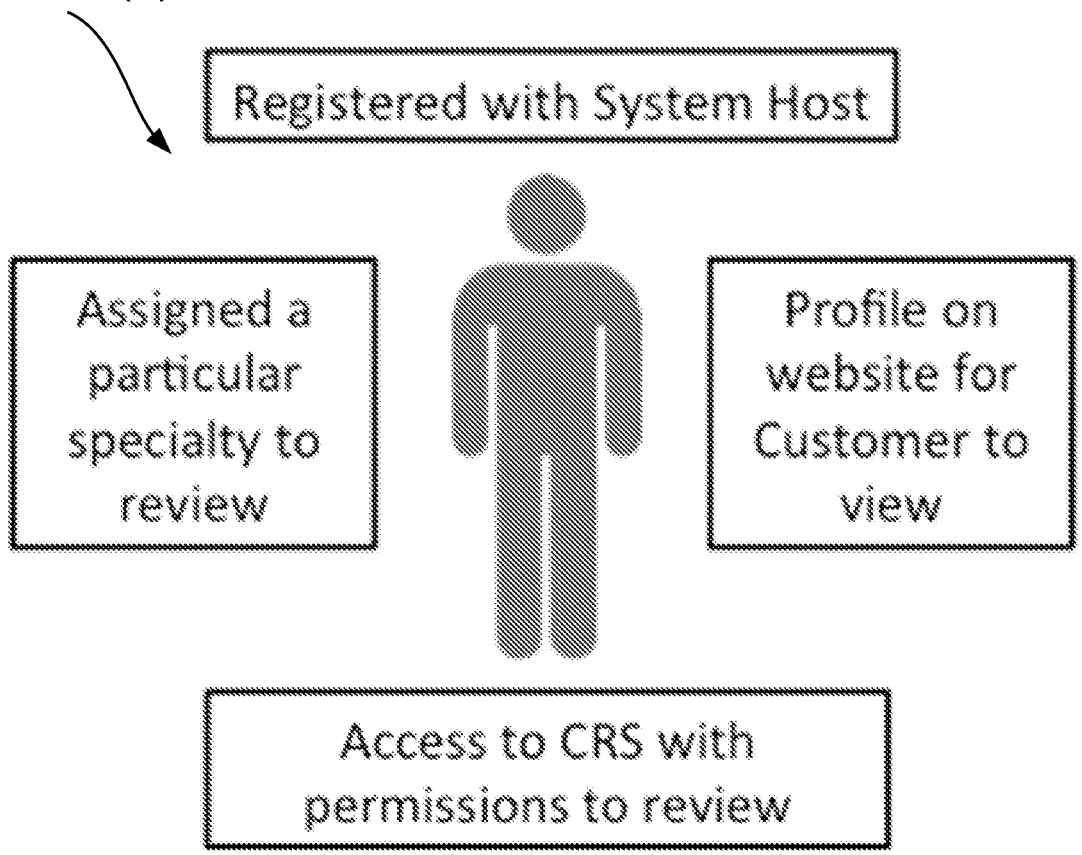
FIG. 7 illustrates characteristics of registered reviewer.

FIG. 7 illustrates characteristics of registered reviewer 24. As previously described herein, the CRS 14 is configured to utilize one or more registered reviewers 24 to provide an evaluation/review of the requested product, performance, and/or service. The one or more registered reviewers 24 generally include individuals who are screened by an administrator 22 for qualifications and credentials so as to ensure that a registered user is qualified to provide an accurate and unbiased evaluation/review. In order to qualify as a registered reviewer 24, and subsequently gain access to the CRS 14, a reviewer has to have certain traits as determined by the administrator 22. For example, a prospective reviewer may first apply to the company as independent consultants and they will be selected among a range of people with different educational backgrounds and experience. Once selected, the registered reviewer will be required to register with the CRS 14 by creating a profile 44 to be stored in the registered reviewer database 34. Further, each registered reviewer 24 may be assigned a particular specialty for reviewing. In some cases, the administrator 22 may delineate sub specialties that reviewers will be assigned. At this point, the registered reviewer 24 now has permission to access the CRS 14 and receive request data to begin performing reviews.

Each registered reviewer's profile 44 will be visible for the public to see (e.g., consumers 26 may have access to the profiles 44 of the registered reviewer database 34). The profile visibility will help in providing assurance to the consumer 26 that any given review is conducted by a real person with credentials. A consumer 26 may view the registered reviewer's characteristics and statistics (e.g., experience level, specialty, subspecialty, number of reviews performed, etc.) as well as all the other reviews that any given registered reviewer has conducted. The administrator 22 may also elect to share additional information about the registered reviewer with the consumer, which includes but is not limited to: age, location, preferences for products, or other general preferences that are associated to a product that can help consumers make a purchase decision. As described in greater detail herein, the CRS 14 includes a checks and balances concept to completed reviews, wherein one or more registered reviewers may be supervised by an assigned system manager and/or the system host so as to ensure that completed reviews are accurate, completed correctly, and are not manipulated.

Figure 8:
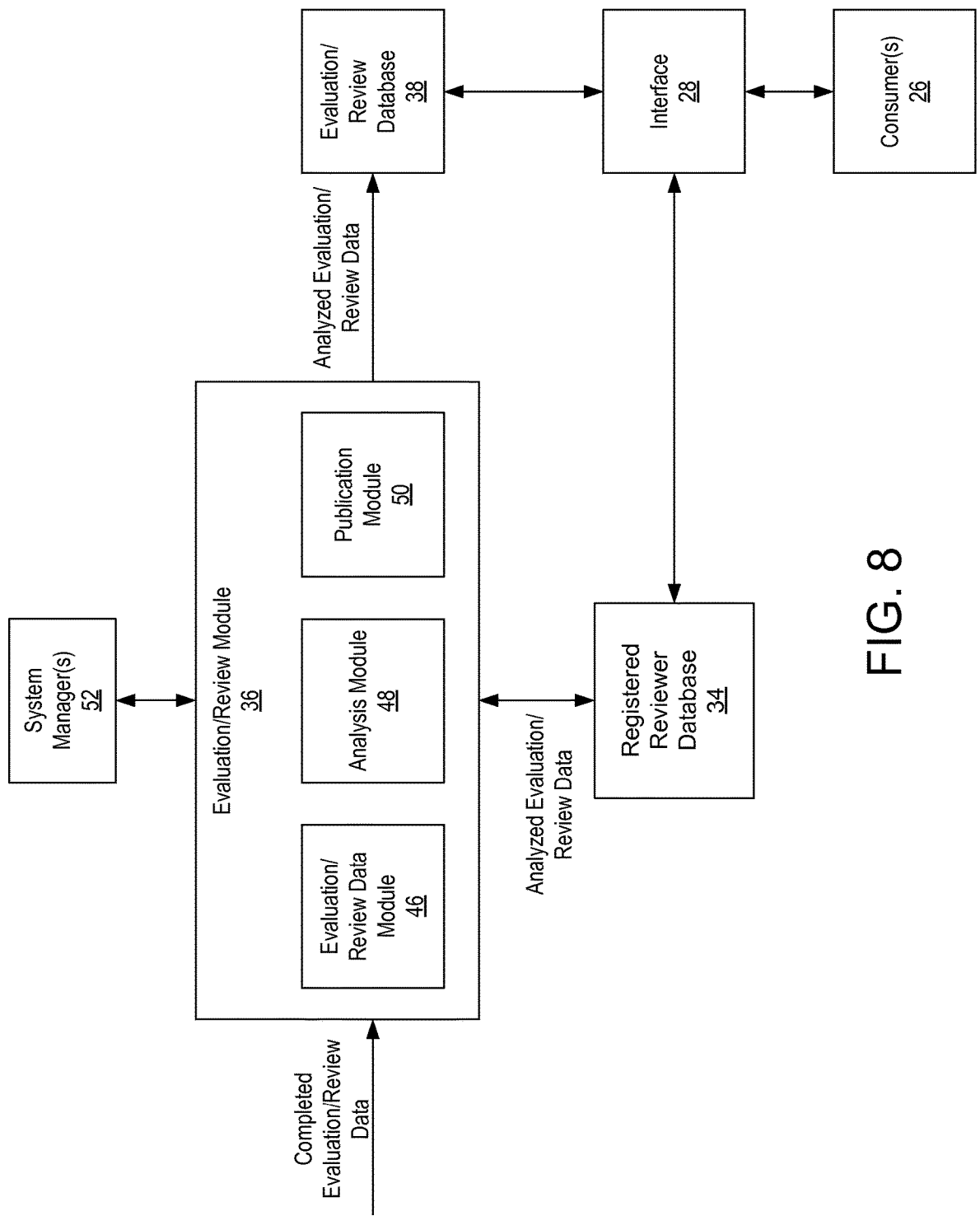
FIG. 8 is a block diagram illustrating the receipt of an evaluation request from a requesting entity, the evaluation of the requested product, performance, or service, and subsequent analysis of the evaluation(s) to provide one or more consumers with an accurate and unbiased evaluation.

FIG. 8 is a block diagram illustrating an evaluation/review module 36 of FIG. 2 in greater detail. As shown, the evaluation/review module 36 includes an evaluation/review data module 46, an analysis module 48, and a publication module 50, the function of each of which is described in greater detail herein.

As previously described, one or more registered reviewers 24 may be assigned to a particular evaluation/review request for a given product of a requesting client 20. In some embodiments, assigning of a particular evaluation/review request to a registered reviewer may occur in a random fashion, such that registered reviewers are picked randomly. In other embodiments, the assignment may occur in a systematic fashion as a result of on one or more parameters based on the requesting client's instructions and/or particular request criteria and/or determined by the administrator. For example, as previously described herein, the requesting client may wish to have very experience reviewers perform a review of their product. Accordingly, as part of the evaluation/review request, it may be specified that only Level 3 and 4 registered reviewers are to perform an evaluation of the product to be evaluated. As such, the CRS 14 is configured to assign only those registered reviewers having Level 3 or 4 status. A registered reviewer 24 may then have access to the request database 32 which may include stored evaluation request files, each file including the specifics of the product to be evaluated and the parameters of such an evaluation, which may be presented to the registered reviewer 24 in the form of at least a cumulative evaluation form to be filled out by the reviewer. Furthermore, the stored evaluation request files may include particular instructions specifying the details of the product itself, the parameters of the evaluation, which may be particularly useful for a registered reviewer when carrying out the evaluation.

Upon completing their evaluation, the completed evaluation/review data (input data included in the completed cumulative evaluation form) may then be received by the evaluation/review module 36, specifically received by an evaluation/review data module 46 for subsequent analysis via an analysis module 48. For example, the analysis module 48 may include custom, proprietary, known and/or after-developed statistical analysis code (or instruction sets), hardware, and/or firmware that are generally well-defined and operable to receive one or more sets of completed evaluation/review data and identify, at least to a certain extent, a pattern related to an accurate assessment of the overall rating of a product based on the completed evaluation/review data.

In some embodiments, the analysis module 48 is configured to compare completed evaluation/review data from one registered reviewer with other completed evaluation/review data of the same product from other registered reviewers so as to generate an overall average rating for the product to be evaluated so as to provide a more accurate and unbiased review. It should be noted that other forms of statistical analysis may be used to calculate an overall rating of an evaluated product, and need not be limited to an overall average rating score. Additionally, or alternatively, the analysis module 48 may be configured to compare an overall rating of one product with an overall rating of similar products, so as to provide a score indicating how any given product compares with other related products.

The analyzed evaluation/review data may be stored within a registered reviewer's individual profile 44 within the registered reviewer database 34. Additionally, or alternatively, analyzed evaluation/review data may be stored within the evaluation/review database 38, which can be accessed by consumers 26 so as to present ratings of the evaluated product to the consumers 26. The publication module 50 is configured to effectively publish analyzed completed evaluations/reviews so that they can be presented to consumers 26. In effect, the publication module 50 essentially transmits completed and analyzed evaluations/reviews to the evaluation/review database 38 when such completed and analyzed evaluations/reviews are verified and deemed viewable (e.g., by the requesting client 20 and/or system managers). Furthermore, the publication module 50 may be configured to publish completed and analyzed evaluations/reviews based on a pre-selected timeframe, as previously selected by the client 20.

The CRS 14 is capable of handling dozens, possibly hundreds of registered reviewers 24. Accordingly, in order to manage the reviewers and ensure that ratings are accurate, the administrator 22 can designate an advanced type of registered reviewer known as a system manager 52. The system manager 52 will have the same rights to review as a registered reviewer 24, but they will have special abilities to monitor other registered reviewers 24. One of the main purposes for a system manager is to verify a registered reviewer's evaluation so as to ensure that the review is accurate, complete, and unbiased. The CRS 14 could possibly post hundreds, if not thousands, of evaluations a day. Accordingly, to ensure that each review is of a high quality, the system managers 52 will have access to particular tools from the CRS 14 to look closer at each review and verify it before it is published to ensure that the requesting client 20 is getting a well written, consistent, and accurate evaluation. For example, any given system manager may be able to access individual reviews for any given product (e.g., reviews of a specific product from a set of registered reviewers). The system manager may then be able to determine an overall consensus based all of the reviews and may further be able to spot any outliers in the group, which may signal a red flag possibly indicative of a reviewer who is somehow biased and/or providing unsatisfactory reviews. The system manager may further have access to individual reviewer profiles so as to get a sense of a reviewer's previous evaluations, thereby allowing the system manager to further build a case against a reviewer appearing to perform in an unsatisfactory manner. Accordingly, the system manager is provided with the ability to investigate and maintain the integrity of the evaluation process of the CRS 14.

As shown, the interface 28 may allow consumer 26 to access the evaluation/review database 38 and/or the registered reviewer database 34. In particular, the interface 28 may allow a consumer to browse completed and analyzed reviews of a variety of different products, performances, or services stored in the evaluation/review database 38. The interface 28 may provide a consumer with tools to aid the consumer in the browsing process, including, but not limited to, a search tool configured to allow a consumer to find a particular product a keyword, such as an product name or general category of the product (e.g., an autobiography book). The interface 28 may further provide sorting functions configured to allow a consumer to sort evaluated products based on category or genre, as well as overall ratings, etc. The interface 28 is further configured to allow a consumer 26 to access the registered reviewer database 34 to view individual profiles 44 of reviewers, such that the consumer 26 can view the registered reviewer's characteristics and statistics (e.g., experience level, specialty, subspecialty, number of reviews performed, etc.) as well as all the other reviews that any given registered reviewer has conducted.

Figure 9:
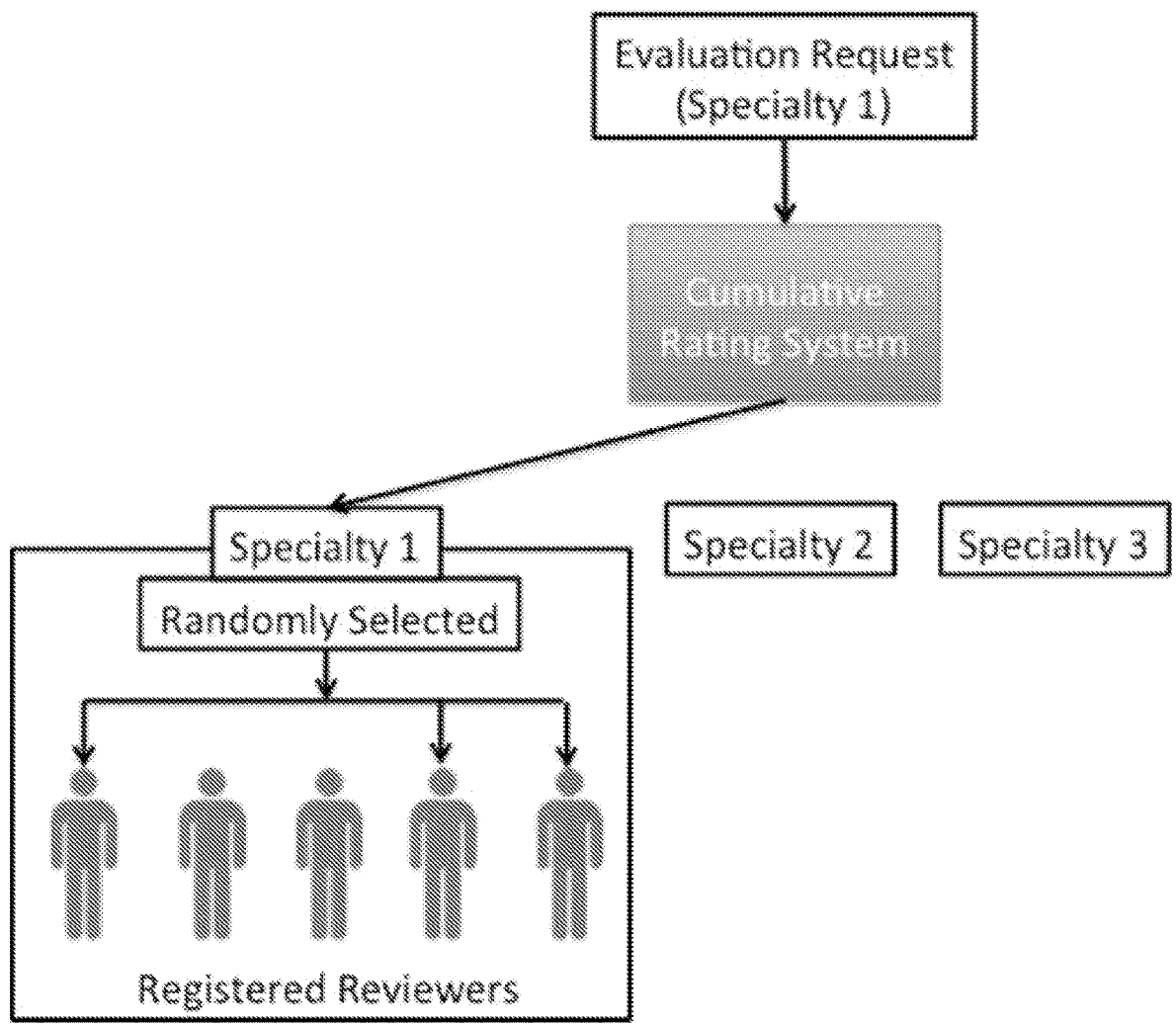
FIG. 9 is a block diagram illustrating assignment of an evaluation request to a particular registered reviewer based on one or more characteristics of the registered reviewer.

FIG. 9 is a block diagram illustrating assignment of an evaluation request to a particular registered reviewer 24 based on one or more characteristics of the registered reviewer 24. As shown, the registered reviewer 24 is assigned a product to review. As previously described, assignment can occur randomly and/or systematically. In some embodiments, the administrator 22 generally does not have the ability to match individual reviewers with a specific product to be reviewed. Instead, assignment may be based on random distribution, so as to ensure that there is unbiased selection. However, the CRS 14 is also configured to organize assignment of evaluations to one or more registered reviewers according to one or more parameters based on the requesting client's instructions and/or particular request criteria and/or determined by the administrator. For example, assignment may occur based on the requested experience required for the registered reviewers and/or the specialty that each reviewer is assigned. The CRS 14 is then configured to access the group of registered reviewers having specified experience levels and/or that are designated to review that particular specialty and then randomly select reviewers from those groups to conduct the evaluations.

Figure 10:
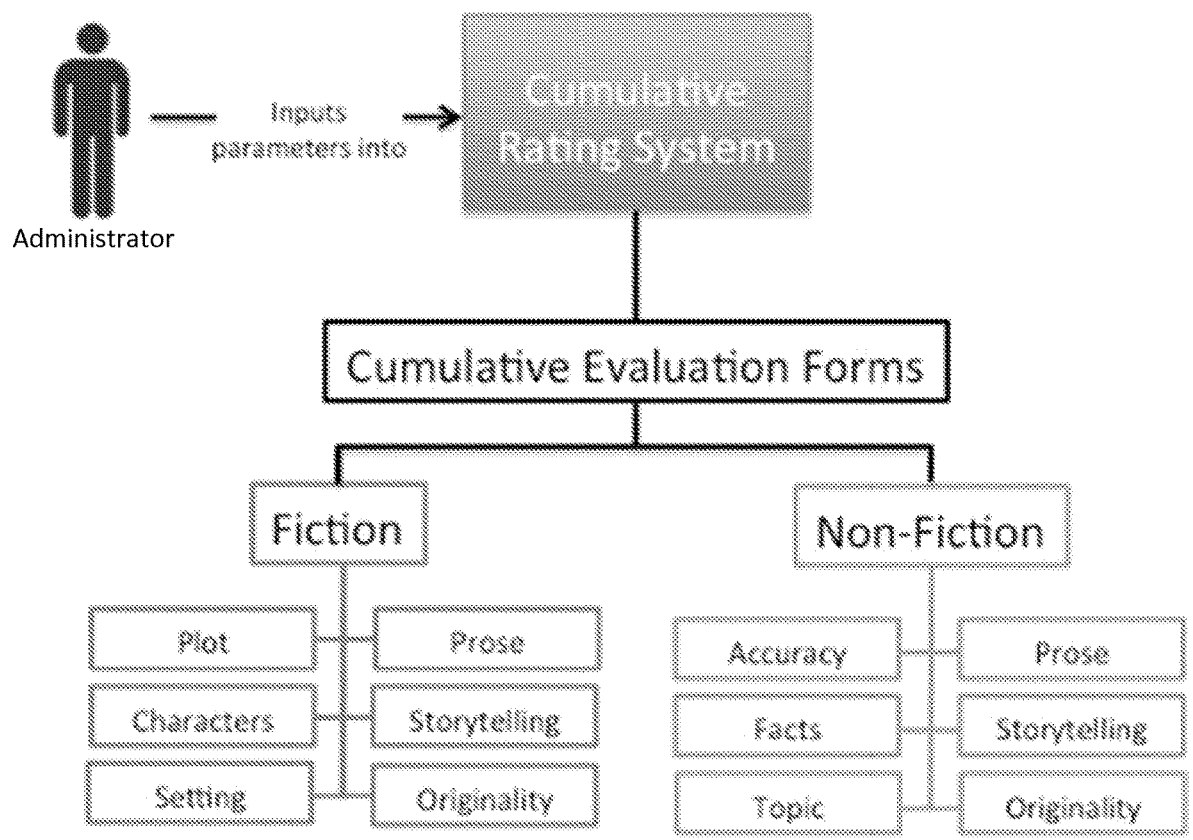
FIG. 10 is a block diagram illustrating creating of cumulative evaluation forms to be provided to one or more registered reviewers.

FIG. 10 is a block diagram illustrating the creation of cumulative evaluation forms to be provided to one or more registered reviewers. Each evaluation for a type of product will be specific to the industry that the administrator is in. Accordingly, an administrator generally has to ability to create standardized cumulative evaluation forms for the registered reviewers to fill out when conducting their reviews. It should be noted that the individual criteria of any given evaluation will be in line with an industry standard. Accordingly, the CRS 14 will implement continual updates to cumulative evaluation forms as needed according to industry standards. Furthermore, periodic consultation with a board of different industry experts may be further relied upon to determine the particular criteria to be included for any given evaluation. Administrators are given the ability to assign a plurality of different categories (e.g., from 2 to 12 or more different categories). Additionally, the administrator 22 can create different types of cumulative evaluation forms for different specialties according to what makes sense for different facets of the industry as a whole. For example, an administrator for an online bookstore will have a different cumulative evaluation form for Fiction and Non-Fiction books.

The CRS 14 further provides an administrator with the ability to customize the different types of registered reviewers based on how many reviews that they've conducted. The administrator can use this as a means to charge requesting clients for different types of evaluations to give their reviews more weight. Furthermore, this will help the consumer analyze the merit of each evaluation score based on the experience of the reviewers who conducted the evaluation.

Figure 11:
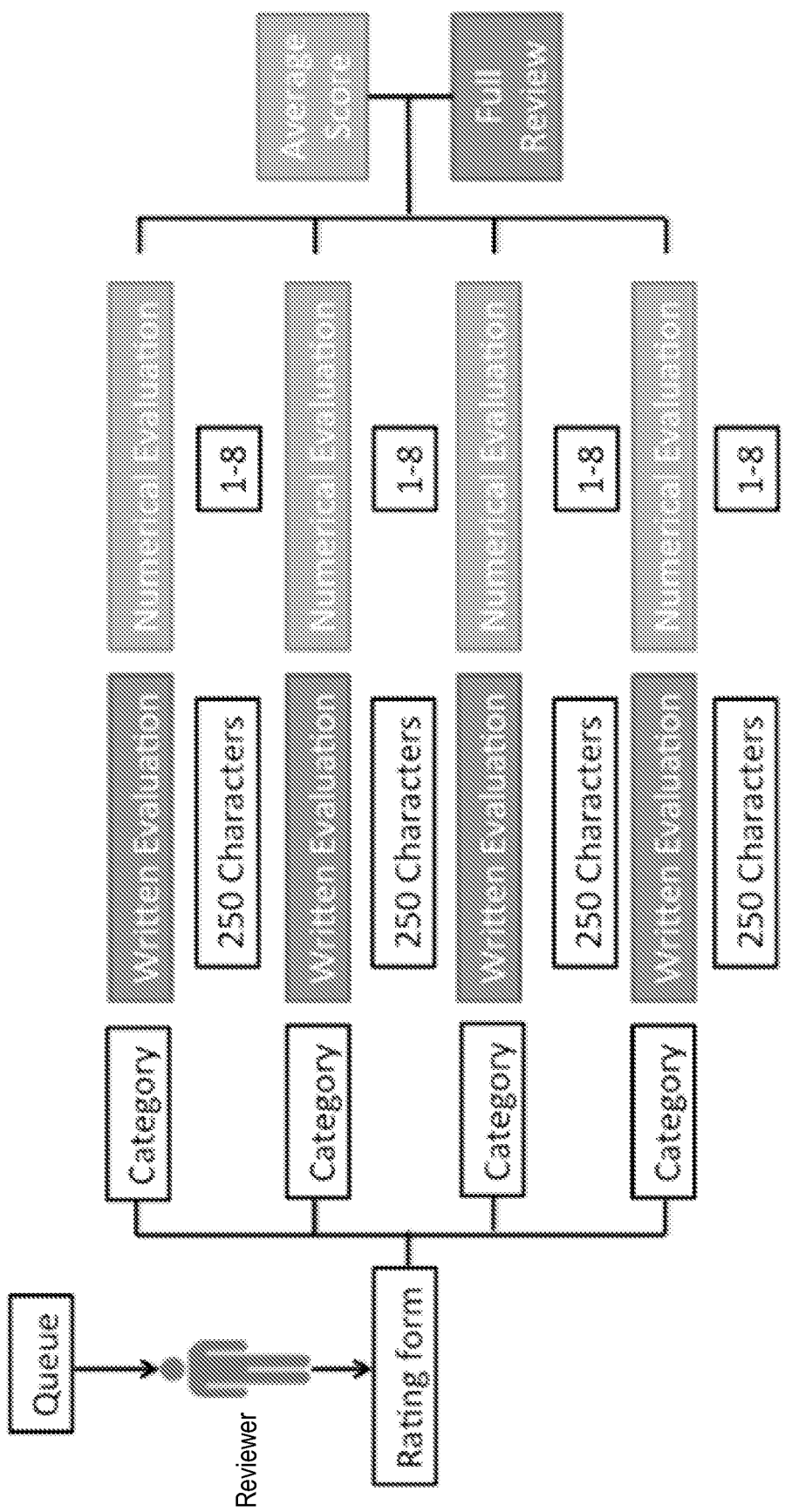
FIG. 11 is a block diagram illustrating an exemplary work flow of a single cumulative evaluation to be performed by a selected registered reviewer.

FIG. 11 is a block diagram illustrating an exemplary work flow of a single cumulative evaluation to be performed by a selected registered reviewer. Upon accepting the review, testing the product, and/or experiencing the product, a registered reviewer then conducts a comprehensive evaluation through the CRS 14. The registered reviewer is able to retrieve the cumulative evaluation from their queue in the CRS 14 (e.g., request data may be received in a registered reviewers profile and/or the registered reviewer may be sent a message indicating the specific request evaluation to be performed). A registered reviewer can then access the rating form and begin their assessment. As shown, the registered reviewer may be presented with a predetermined amount of categories that will give them the option to enter in a score from a specific numerical range as provided by the administrator (e.g., one to eight) and a short written evaluation. After a registered reviewer has completed their evaluation, they will have an average score for that product and a full written review that is ready for presentation. FIG. 12 illustrates an exemplary cumulative evaluation form template. This is a template for the categories for the cumulative evaluation form that the registered reviewers will use when conducting their reviews. It should be noted that cumulative evaluation forms generally include uniform review criteria, thereby ensuring that all reviews for any given product, performance, and/or service is consistent and comparable to one another, thus making the reviews more measurable to customers.

Figure 13:
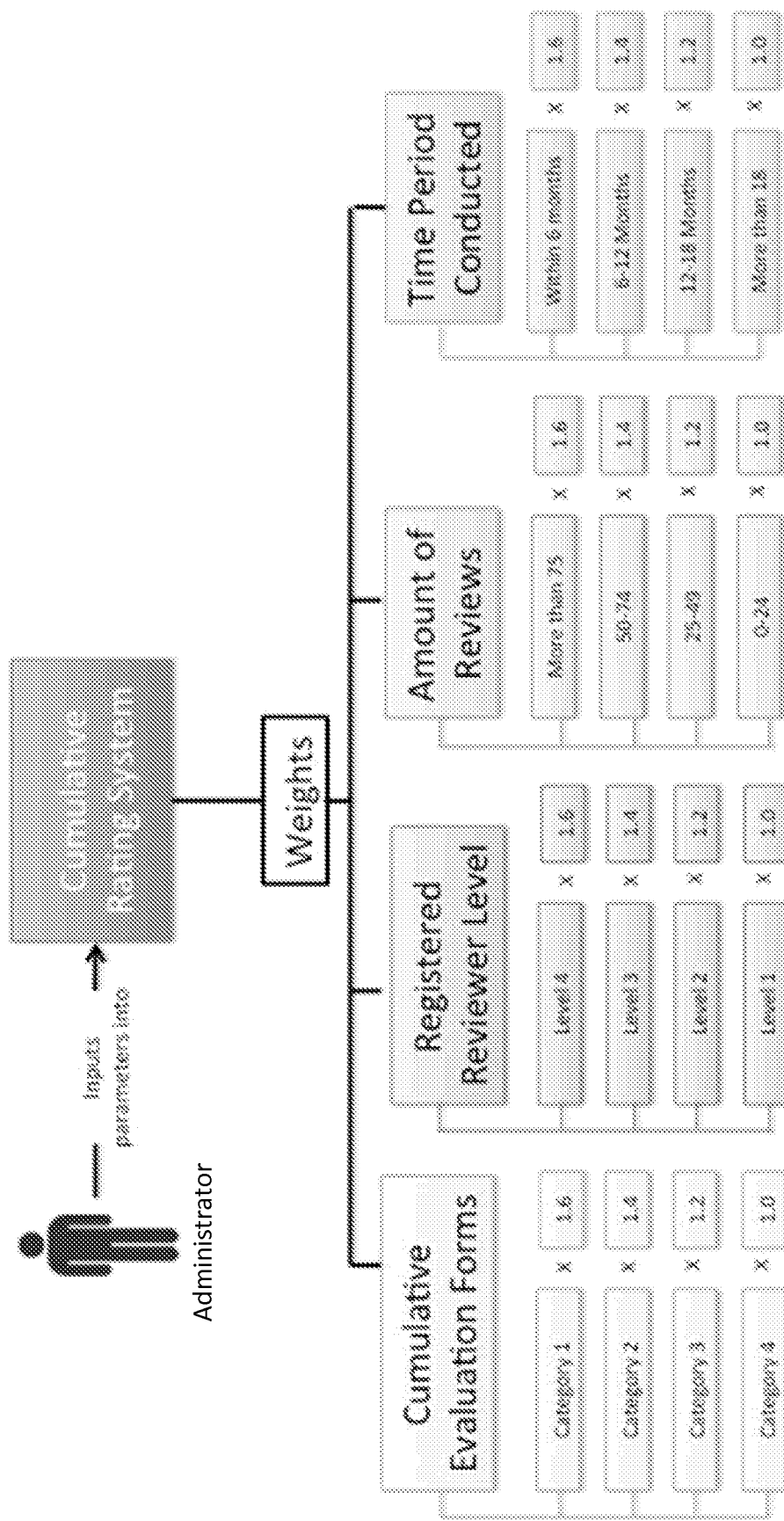
FIG. 13 is a block diagram illustrating the customization of scoring parameters of an evaluation of any single product.

FIG. 13 is a block diagram illustrating the customization of scoring parameters of an evaluation of any single product. The administrator has the option to weight different aspects of the CRS 14 based on their preferences. For example, they can give registered reviewers options to weight different categories they score. The administrator can also weight each level type of registered reviewers. They can also weigh a product based on how many reviews the product received and even how long ago each of the reviews were conducted. In one embodiment, administrators can use "Olympic Style" scoring, whereby they can eliminate the top and bottom scores of a review in order to give a better average. This may only be an option available for the administrator and another tool to cut down on manipulation by reviewers. Overall, this allows the administrator the ability to give a more accurate depiction of the rating of a product based on their industry.

For example, the administrator can set weighted numbers for the sets listed in FIG. 13. They can give more weight to a product that has more reviews and less weight to those that have fewer reviews. Additionally, or alternatively, they can give weight to reviews that have higher-level registered reviewers than those with lower level registered reviewers. In any case, the administrator has the ability to customize the weights of several different facets to help present the most accurate rating of a product for the consumer. Furthermore, an administrator can set parameters where products, services, or performances can be re-evaluated, thus wiping out old reviews and creating new reviews for the new version of the product. For example, if an author rewrote their book to correct typos and plot holes, the old version can be replaced in exchange for the client purchasing a completely new set of reviews. This can be done with restaurants that create a new menu, or bands that take on a new drummer.

Figure 14:
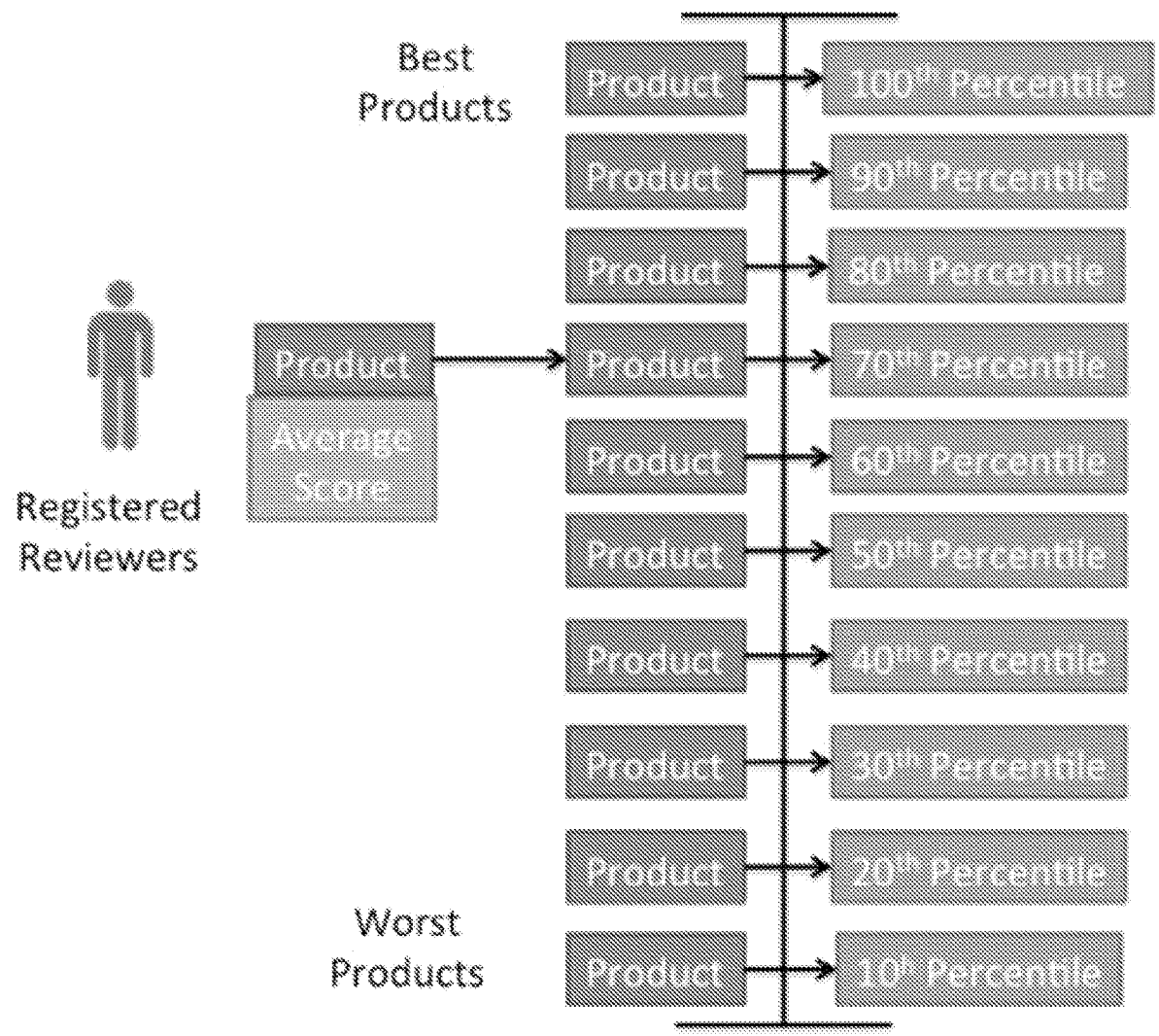
FIG. 14 illustrates the scoring range in which any given evaluated product falls in relation to other evaluated product from a single registered reviewer.

FIG. 14 illustrates the scoring range in which any given evaluated product falls in relation to other evaluated product from a single registered reviewer. Once a registered reviewer has completed their evaluation, the score may be used to help determine where that product is in relation to other products reviewed by that registered reviewer (carried out by the analysis module 48, for example). For example, the registered reviewer will have their numerical score for the product, wherein that numerical score will help determine which products are the best and which are the worst. The products will be organized in a registered reviewers profile 44 by the best products they've reviewed at the top, and the worse products they've reviewed at the bottom. All products will be in similar specialties that have the same criteria in the cumulative evaluation form, meaning that the registered reviewer is grading each product with the same categories and criteria. The placement of these products will then be converted into a percentile, as shown in FIG. 14.

Figure 15:
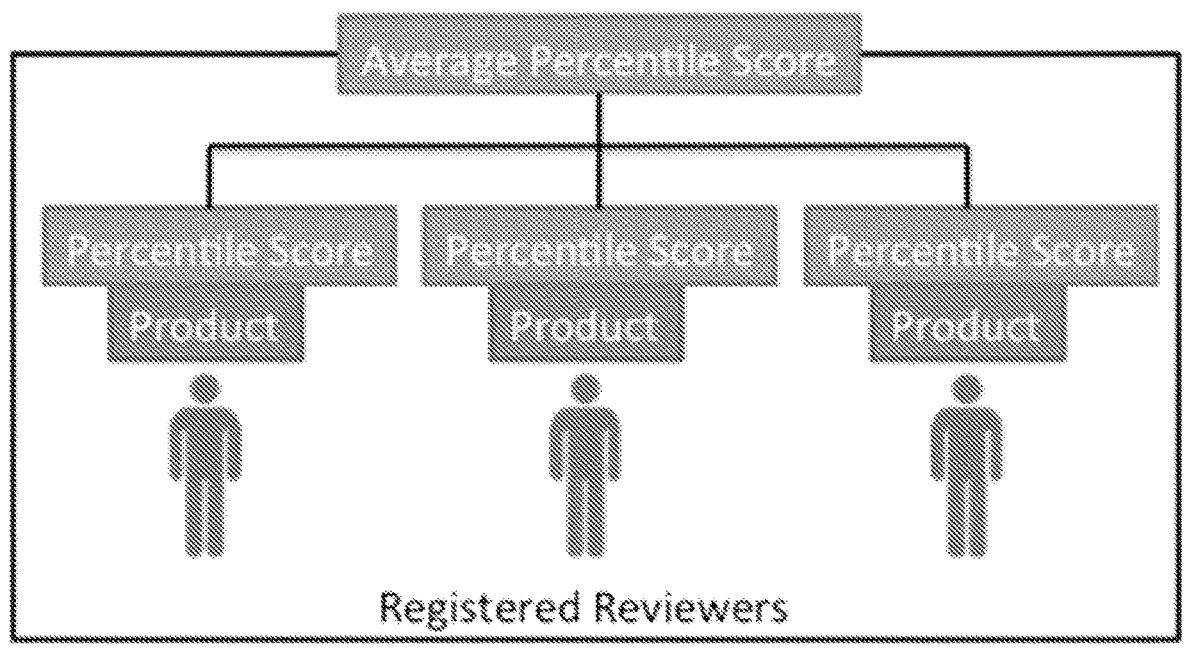
FIG. 15 is a block diagram illustrating the generation of a master score of a single product based on a statistical analysis of multiple completed evaluations of said product.
Figure 16:
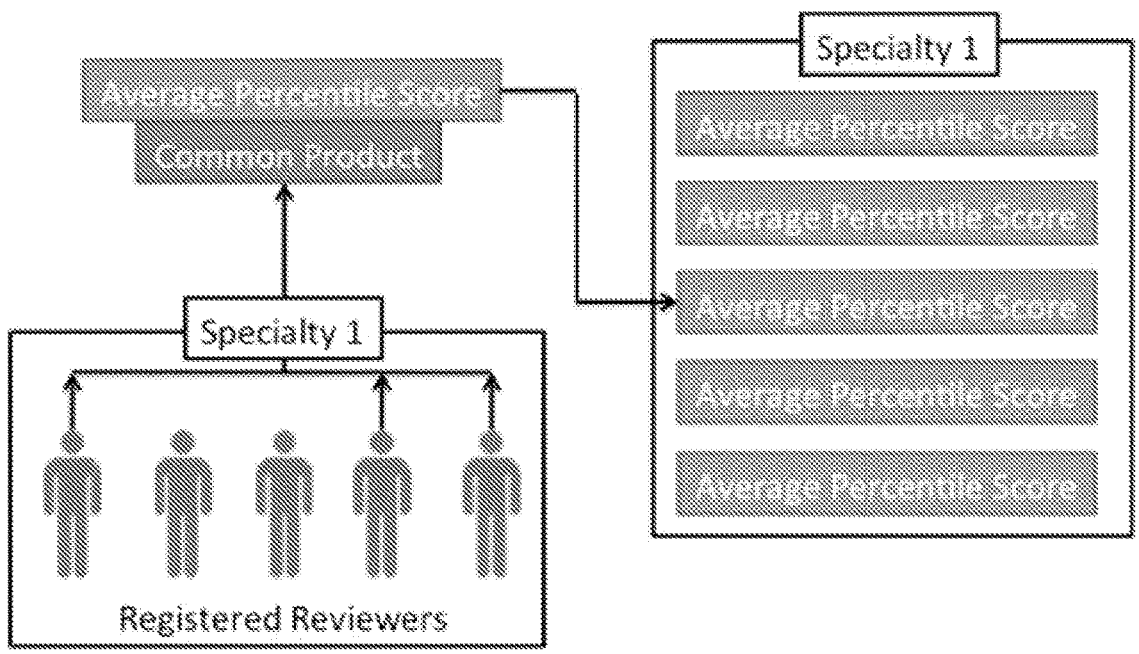
FIG. 16 illustrates an exemplary display of an average percentile score of a single product requested to be evaluated.

FIG. 15 is a block diagram illustrating the generation of a master score of a single product based on a statistical analysis of multiple completed evaluations of said product. FIG. 16 illustrates an exemplary display of an average percentile score of a single product requested to be evaluated. After at least a set number of registered reviewers have evaluated a product (e.g., at least three separate reviewers), all the percentile scores will be compared to present a master score that represents the most accurate rating of a product available. Accordingly, all registered reviewers will review similar products and when the registered reviewers complete their evaluations, the evaluation/review module 36 is configured to receive those scores and group them together based on other reviews on that product. The evaluation/review module 36 is configured to compare the percentile score of each evaluation and obtain an average score. Once an average percentile score is attained, the evaluation/review module 36 presents the average percentile score against other common products with an average percentile, as shown in FIG. 16.

Figure 17:
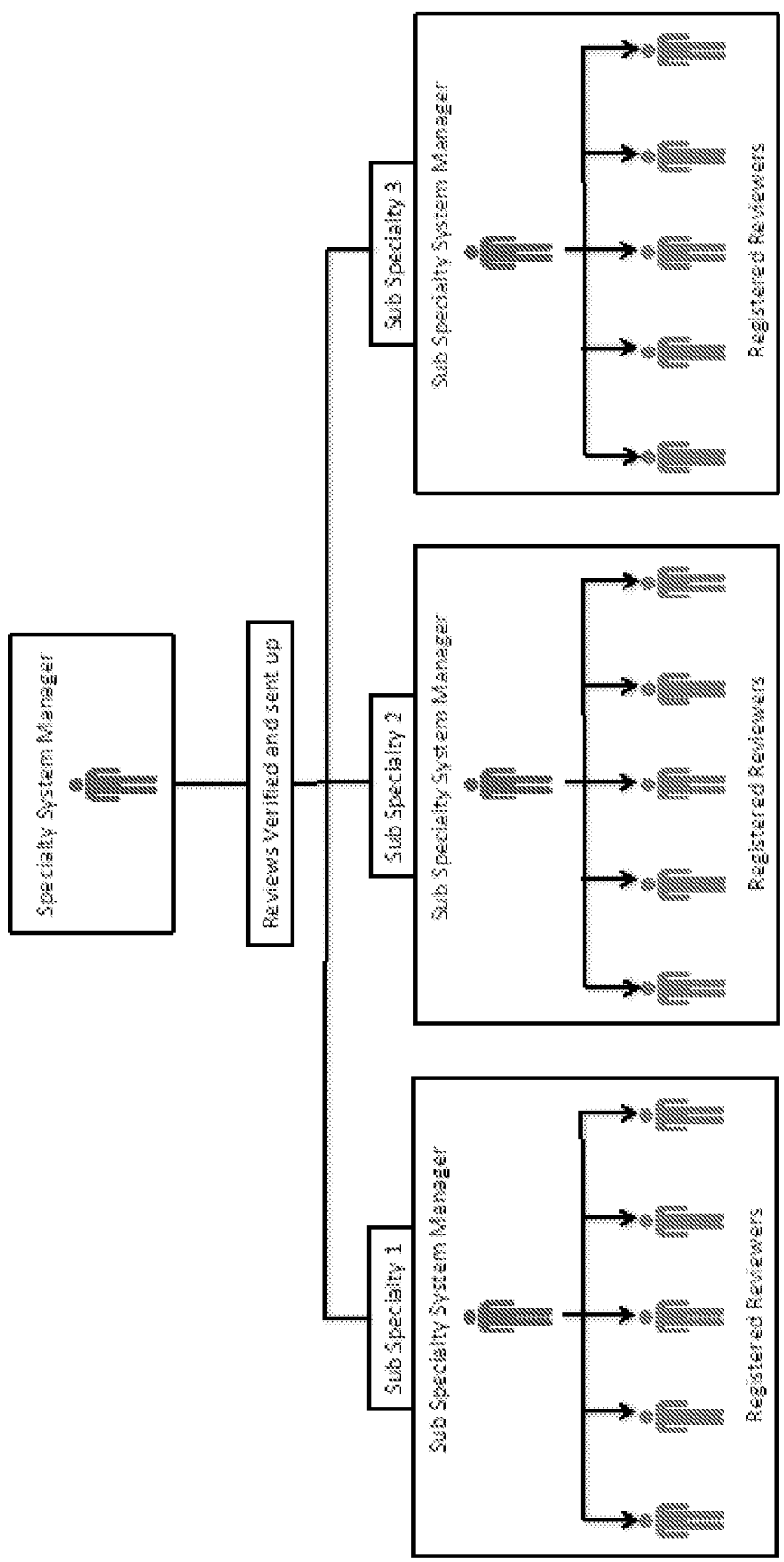
FIG. 17 is a block diagram illustrating submission of completed evaluations from one or more registered reviewers to system managers for subsequent verification and allowance.

FIG. 17 is a block diagram illustrating submission of completed evaluations from one or more registered reviewers to system managers for subsequent verification and allowance. As previously described, the CRS 14 an administrator 22 can designate an advanced type of registered reviewer known as a system manager 52. The system manager 52 will have the same rights to review as a registered reviewer 24, but they will have special abilities to monitor other registered reviewers 24. One of the main purposes for a system manager is to verify a registered reviewer's evaluation so as to ensure that the review is accurate, complete, and unbiased. The CRS 14 could possibly post hundreds, if not thousands, of evaluations a day. Accordingly, to ensure that each review is of a high quality, the system managers 52 will have access to particular tools from the CRS 14 to look closer at each review and verify it before it is published to ensure that the requesting client 20 is getting a well written, consistent, and accurate evaluation.

As shown in FIG. 17, the administrator can assign system manager's particular sets of registered reviewers to manage. The CRS 14 is set up so that system managers exist within particular specialties, sub specialties, and sub sets. Thus, there can be a hierarchy of system managers who all check each other and report up the chain of command. This also allows the administrator the ability to designate leaders at every level and make all the reviews and information passing through the CRS 14 manageable. The CRS 14 is optimized so that the administrator can set verification parameters. More specifically, an administrator can require system managers all the way up the chain of command to verify the review until it is published, giving the administrator the ability to make the system as secure as they see fit.

For example, a system manager is assigned a sub-specialty of science fiction—time travel. A registered reviewer submits their review to the subspecialty system manager. After reviewing it, the administrator requires that the specialty system manager approve it, and it is sent up higher along the hierarchy. Only after the specialty system manager reviews the evaluation is it allowed to be published for viewing by a consumer. Accordingly, use of the system manager hierarchy concept makes the CRS 14 less prone to manipulation.

System managers are experienced registered reviewers with several evaluations in the system. They understand the system enough to teach it to their registered reviewers that they are assigned. Additionally, the CRS 14 will have the system manager assigned the first review of a particular product so that they can accurately screen other reviews from registered reviewers. Therefore, they also have the ability to recognize inconsistencies in a review for a particular product. They can identify these people easily, and thereby eliminate them from the system in the event that a registered reviewer is trying to 'game' the system to someone else's advantage.

For example, a system manager may have ten registered reviewers assigned to him/her. All registered reviewers are selected to review a particular mystery book. As the completed evaluations come in, all of the reviews range from the 40th percentile to the 60th percentile. However, one registered reviewer scored this mystery book as their 95th percentile. Although this would not be enough to sway the overall score enough so much that it would have an effect, the system manager can see all of this information and identify that this registered reviewer may not have scored it correctly and can investigate.

Figure 18:
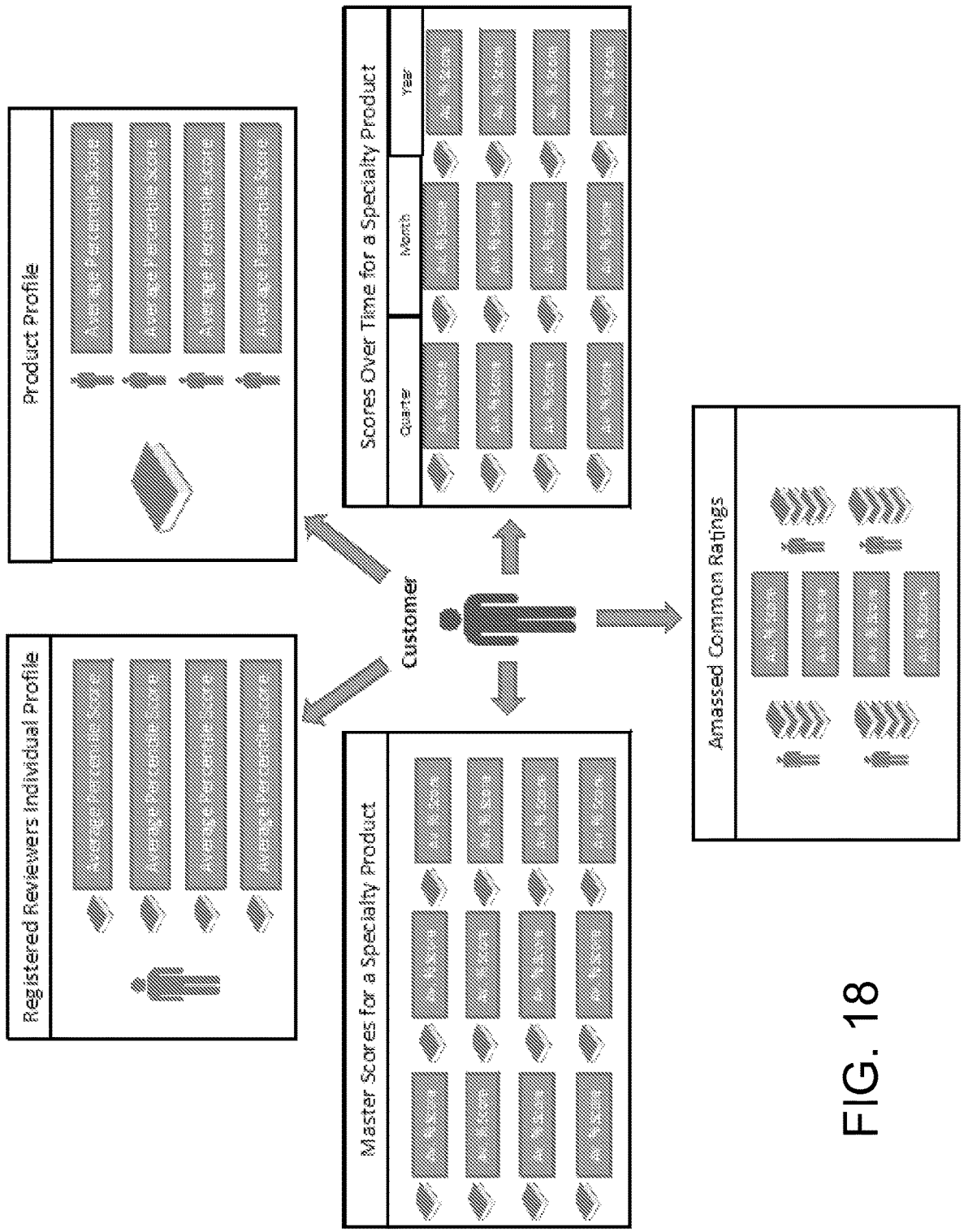
FIG. 18 is a block diagram illustrating exemplary display options provided to a consumer.

FIG. 18 is a block diagram illustrating exemplary display options provided to a consumer. The CRS 14 is optimized to present ratings in different ways to the consumer. Additionally, the consumer can see those ratings next to the products and be able to order or purchase them through the cloud-based service. In essence, every consumer has different preferences for how they make a decision. They may want to follow only one reviewer's recommendations, or they want to see how all reviewers have evaluated that product over the entire course of its history. The CRS 14 is configured to provide a consumer with a variety of viewing options so as to enhance and improve the consumer's decision making process.

Depending on the industry, the manner in which ratings are display is an important factor to consider. Therefore, the administrator has the ability to adapt the CRS 14 to organize ratings in particular sets and display those sets to consumers as they see fit. The ratings can be customized for display to consumers in several different ways. Depending on the industry, the types of products, and the preferences of the administrators, information can be displayed by each personal registered reviewer or grouped together by specialty and subspecialty, or they can show reviews based on when the reviews were conducted.

One of the main ways the CRS displays ratings is by directly associating ratings with a product. The CRS is optimized to group all ratings for a particular product. It can then show this rating information. Thus, when a consumer comes to the administrator's website (which implements the CRS 14), the consumer can elect to view individual products with all the rating information directly in front of them. Thus, they can make a purchase decision by reviewing all ratings and numbers available for that product.

Figure 19:
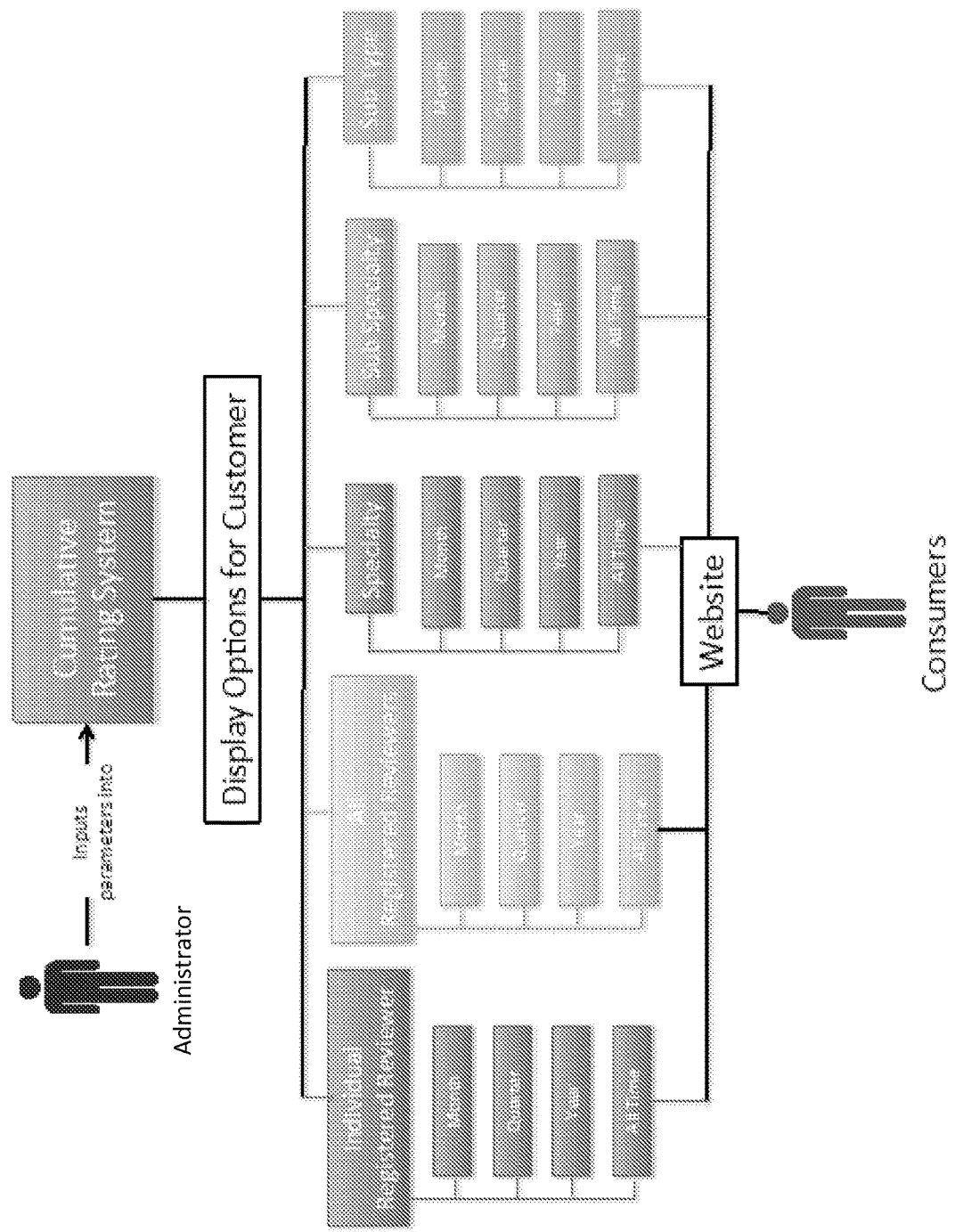
FIG. 19 is a block diagram illustrating exemplary display options of profiles of registered reviewers for a consumer to view.

Some customer may prefer to follow individual registered reviewers. As previously discussed, registered reviewers can optimize their preferences for what categories they deem more important than others. Their profile for all the products they reviewed will be available for customers to see. So, a customer can make a purchase decision for a product based off of one registered reviewer who shares the same preferences as them. As shown in FIG. 19, an administrator can display an individual registered reviewer's reports by grouping what they reviewed in a certain timeframe (e.g., present month, last three months, etc.). Additionally, or alternatively, the administrator can group them into what they have done all year. This way, they can customize what a consumer can see and how they compare what reviews a reviewer has done, giving the consumer more information to make a purchase decision.

For example, Stephen King is a registered reviewer for the CRS and has more than 100 thriller books under his profile. There are some customers who respect him as an author, but also like his preferences for his reviews. Therefore, customers may elect to read books that are at the top percentile of his profile.

Some customers may want to make a purchase decision based on the master score, or the compared scores of percentiles from all registered reviewers who evaluated that particular product. A list may be presented to the customer of all similar products. This allows the customer to compare similar products and their rating to others. When they click on a particular product, they are taken to the individual product to see its reviews and ratings in detail. For example, a customer looking for a doctor investigator mystery books can look in this sub-genre and compare the master scores of all doctor investigator mystery books. Or, they can look and see how those doctor investigator books match up to all mystery books overall.

Customers may elect to view these ratings in order to follow trends or find new products. Additionally, the administrator will want to give the requesting clients the best possible chance for success by making good ratings visible to the customer. To achieve both of these objectives, the administrator can group ratings based on when the reviews were published. Some of the most basic options are to group reviews that took place within a given period of time, as set by the administrator (e.g., monthly, quarterly, yearly, or overall). For example, the administrator can show consumers what romance books were rated this month. Although the top rated book for that month may not be the top rated romance book overall, the author for this romance book can still tote that they were the "top rated book of October", and the customer can keep pace with good books that are released or rated, thus giving readers a more diverse option of good books to read.

There will be situations where several registered reviewers will have more than one similar product that they've reviewed. To add an extra level of analysis for a customer, the CRS can group select registered reviewers who have more than one product reviewed in common and present them to the customer. For example, there may be five registered reviewers who all evaluate mystery novels. Between the five of them, they all have the same six books in their profiles. The administrator can use the CRS to group these five individuals into a special bracket and present a new set of ratings that are based only on the common books they've all read.

As shown in FIG. 18, there are several different possibilities for how an administrator can shape the presentation of scores based on specialty, product, registered reviewers, and timeframes. The CRS is capable to compare all of these categories in many different combinations to best present information to a customer based on the industry. For example, an administrator in the automobile industry may put a great deal of emphasis on showing individual registered reviewers' profiles or general master ratings, as these are items only renew every year. Whereas, if the administrator is in books, they may put more emphasis on showing information for amassed common ratings and ratings over different periods of time, as the number of books released on a daily basis is much higher than cars.

Figure 20:
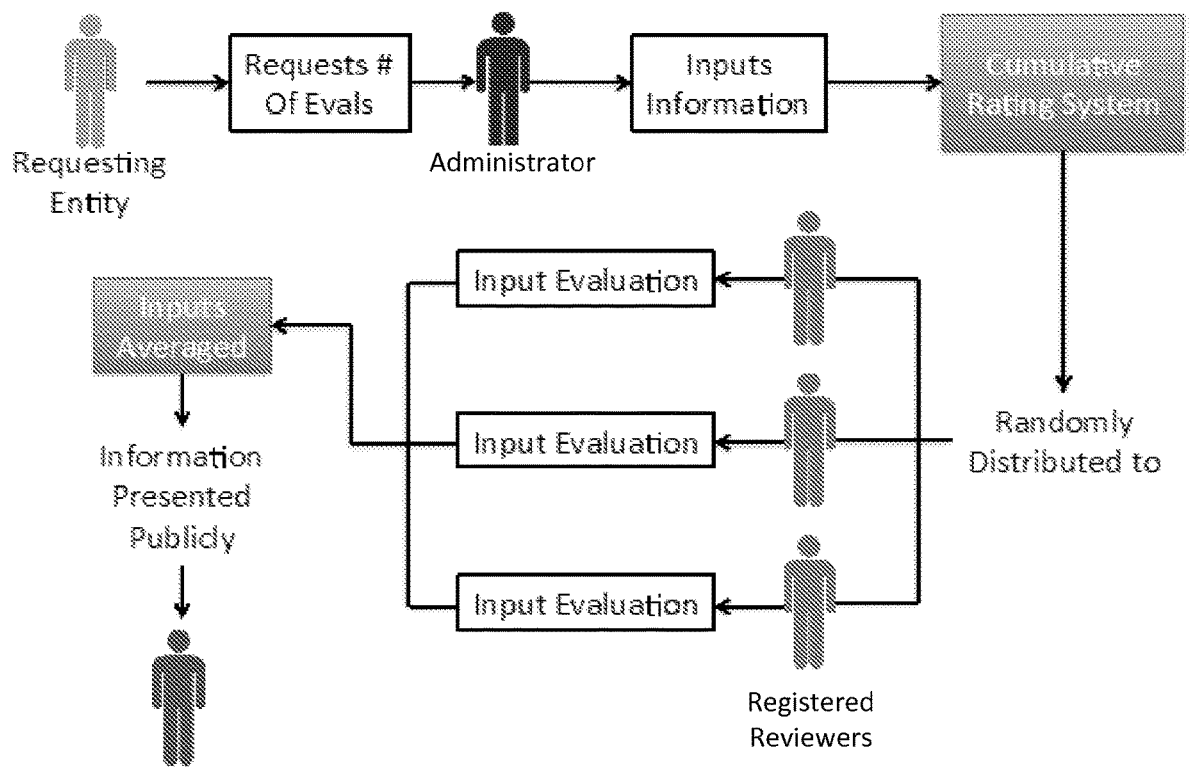
FIG. 20 is block diagram illustrating the basic workflow of the CRS of FIG. 1.

FIG. 20 is block diagram illustrating the basic workflow of the CRS of FIG. 1. In one embodiment, an exemplary workflow of the CRS consistent with the present disclosure includes the requesting client requesting evaluations from the administrator, the administrator processing the basic information of the requesting client and inputting it into the CRS. The CRS randomly assigns registered reviewers to conduct an evaluation for the product. The registered reviewers utilize a standardized evaluation form and input their scores into the CRS after experiencing, using, or observing the assigned product, performance, or service. Inputs from the registered reviewers are verified by the system managers and are combined with reviews that cover the same product, performance, or service. All information about the reviews is made available public to the consumer via a website, web application, or other means.

The CRS of the present invention is optimized for additional features that make it a great tool for customers, administrators (industry users) and for registered reviewers. The industry user can use the CRS to allow customers to interact directly with registered reviewers. The purpose of this is to get a 'personal' feel and to make the reviewer real in the eyes of the customer. So, if the customer is overwhelmed by the information they are presented about products in a profile, the customer can simply ask them and get a recommendation based on what the registered reviewer has done. Or, they can be pointed to other registered reviewers that can offer them help. These conversations will, of course, be monitored within the CRS to ensure that registered reviewers are acting within accordance with the guidelines set with the Industry User.

The CRS is optimized to allow industry users to equate a rating with a particular price. This is especially helpful for the industry user and for the customer. Higher prices mean a higher quality or a preferred product, whereas lower prices mean a less preferred product. This makes it easy for the customer to identify what products are worth buying simply by the price. This is effective for the industry user so that they can receive the highest amount of revenue for each product based on 'the market'.

The CRS can be configured to release particular information to the registered reviewer, based on what product or service is being evaluated. For example, an industry user can elect to give a registered reviewer a book to review, but remove the title, author, and publishing source. Therefore, a registered reviewer is more likely to make an unbiased report due to lack of information about the author and their previous work.

The main feature of the CRS that makes it less prone to manipulation is that the industry user does not have the power to be able to designate particular reviewers for particular products. The CRS calculation for distributing to registered reviewers is held only by the system host, who will update and change the algorithm constantly to ensure security. This prevents industry users from collaborating with requesting clients to rig ratings. Additionally, this also prevents requesting clients from buying off or collaborating with registered reviewers without the knowledge of the industry user or system host. With pluralities of registered reviewers in particular specialties, a requesting client would have no way to know who would have their product for review until after the review is approved and released.

The more registered reviewers are in the system and give reviews to products, the less likely the system can be manipulated. The CRS can allow thousands of reviewers for every level of specialization, and it will be highly recommended by the system host to the industry user to get as many people as possible in all specializations and levels. The CRS will be equipped with several different tools and measurements to monitor the ratings, and the more people who are in, the more information the Industry User has to compare it to other reviewers to see who is trying to 'game the game'. Additionally, customers looking to buy off reviewers will not be able to pick exactly which reviewers will get their product, as the probability that they will choose correctly will decrease significantly with the more registered reviewers there are.

One of the unique features that the CRS can employ is weighting the ranking of business or products based on when they were reviewed. Some products may change over time, such as a restaurant offering a different menu or a band significantly improving its stage presence. In that event, reviews degrade over time. Therefore, the CRS is optimized to weight ratings so that the most current one carries the most power. This in turn will entice requesting clients to renew their ratings with the industry user in order to be the most competitive product or business in their field.

There are some businesses that may want to receive and independent consult about their product before it goes to market, or may want to see what rating they would receive before it is published in the CRS. The CRS can accommodate these requesting clients by providing them reviews that are private to them. Additionally, the industry user can create a more comprehensive feedback form in the cumulative evaluation form to give the requesting client more information on how to improve their product. Accordingly, offering competitive prices for both the requesting client and compensation for the registered reviewer will eliminate the possibility of requesting clients trying to contact registered reviewers and gain opinions from them without the industry user's knowledge. This is also an additional revenue producing service that the industry user can offer their clients.

The CRS can be configured to match customer preferences up with reviewers who share similar preferences. This will allow the customer to find reviewers who are similar to them in either physical appearance, location, likes, dislikes, and other various criteria that is dependent on the industry to help them find products that they would mostly likely buy. For example, a man who is over six foot five may insert his own dimensions into the CRS to find reviewers who are his height and build, then see what places they prefer to shop for clothes for clubbing.

In the event that the industry user chooses, the CRS is optimized to have reviews adjusted or pulled from publication. If an industry user suspects that a registered reviewer's profile has been compromised, they can pull the entire profile and investigate their reviews. Additionally, they give registered reviewers periodical permission to adjust their scores. This can be an automatic permission given to registered reviewers at particular times, such as after six months or after 30 reviews. They can give registered reviewers full permission, or they must be approved and reviewed by system managers or industry users. Additionally, or alternatively, the industry user can elect to never give registered reviewers the ability to adjust their scores.

One of the main benefits for requesting clients is their ability to monitor the performance of their reviewed products that are in the CRS. Requesting clients have their own dashboard in the CRS (via the interface) where they can order more reviews, adjust the date release of those reviews, add another product, and ask questions to the industry user. This dashboard will also show statistics about their products, such as the rise and fall of their rating, and sales information of their product through the cloud-based service or website. For example, an author selling an eBook through the CRS can see if their rating has risen, how many units they've sold, and adjust the release date of their next review to coincide with their marketing plan. Companies with several products can monitor them all and get excellent feedback on their products and how to improve them based on performance over time.

Another benefit of this system is that products will not be available for purchase or for viewing by the public until they have at least a minimum number of ratings (e.g., at least three ratings). The benefit of this is that customers will always have information available about a product before they purchase them, and reduces the risk they take for purchasing a product without information. For example, customers looking at vacuums on other sites will be hesitant to buy a new vacuum because it does not have any reviews. On the CRS, all products will have a minimum amount of reviews but will also provide accurate comparison. Therefore, new products taken to market with the CRS will provide customers the needed information without making them feel like the "guinea pig" in taking a risk on purchasing a new vacuum with no reviews.

Accordingly, the cumulative rating system of the present invention overcomes the drawbacks of current review system models. The CRS is configured to generate accurate and unbiased evaluations of products, performances, and/or services, thereby improving the reliability of information provided to a consumer. Furthermore, the CRS is optimized for providing improve visibility and interaction with ratings of products, performances, or services, thereby making it a great tool for customers, administrators (industry users) and for registered reviewers alike.

The selection of the registered reviewers by the administrators is key in ensuring that the CRS functions successfully and produces accurate information that is not manipulated by outside sources. Therefore the process in which reviewers are selected is the first line of defense against businesses or others who seek to commit reviewer fraud.

Selection of Reviewers

In one embodiment, registered reviewers do not need to be experts with high credentials. It may be beneficial for reviewers to be a sample of the local population, or a sample of a population that commonly uses that product or service.

In one embodiment, the first step for selecting reviewers will be to hold a lottery. This lottery will be open to the specific customer base of those who use and experience the product. For example, if the administrators evaluate restaurants, they will open a lottery to individuals who are in the local area who have purchase power for experiencing restaurants. The lottery will be capped at a particular amount, such as 1200 people. From here, the administrator will follow the rule of thirds and select no more than 400 of these people to be vetted.

The second step for selecting reviewers is to select reviewers who meet a general standard criteria and to fulfill a quota based on accurate representation for a sample of the population. It is recommended that these criteria and quotas be kept in secret and not disclosed to the general public. For example, administrators evaluating restaurants will select X amount of people between the ages of 18 and 25, X amount of people between the ages of 26 and 35, and so forth. When screened, they will look for individuals who have a social media presence on Facebook or Twitter, have some college education, allergies to particular foods, live within 20 miles of the center point of a particular area, etc. From here, the administrator will also apply the rule of thirds, only accepting one third of the second round of selections. For example, if the administrator selected 400 people from the lottery, the goal will be to have no more than 134 people who meet the criteria.

The third step is controlled by the CRS. As stated, the CRS will randomly assign reviewers to a specific genre and specific sub genres (if they are applicable). At no time will the administrator, system host, or any other plays have control over the randomization of reviewers to specific genres. It is recommended that a randomization algorithm be used to determine how reviewers are distributed. Once the reviewers are divided into their selected genres, they will not be allowed to move genres. Once reviewers have experience and administrators want to give reviewers the ability to evaluate a second genre, they will be randomly assigned again. Reviewers not be able to have more than ⅓ of the available genres assigned to them for evaluation.

Rule of Thirds

In one embodiment, the CRS follows a principle called the "rule of thirds." This is a simple approach for limiting the availability of registered reviewers, their capabilities, the amount of reviews, and other factors within the CRS to help reduce the amount of manipulation that could take place.

The rule of thirds applies to the selection of registered reviewers as outlined previously herein.

The rule of thirds also applies to the distribution of reviewers to a specific genre. As a rule, there must be at least a 3 to 1 ratio of registered reviewers to clients in the CRS. Clients are also not allowed to purchase more than 33% of reviews that are available within their specific genre. For example, if there are 30 Mexican restaurant reviewers, a Mexican restaurant will not be allowed to purchase more than 10 reviews for their specific restaurant.

This rule may also be applied to situations where registered reviewers have different levels. Clients will not be able to purchase more than ⅓ of the available reviewers in a specific level (if such levels exist within the CRS). For example, if there are 12 level four reviewers in the system, the client is can only purchase up to 4 level four reviews.

Training Reviewers

The CRS employs uniformed review templates that will be specific and consistent across different industries. When registered reviewers are put into the CRS, they are required to undergo at least a minimum type of basic training for how to score each business or product they are evaluating, how their scoring works, how to balance their profile, and what language goes with each score they select for each section. Each reviewer will have a unique average for each specific type of business or product they use, and it is incredibly important that they understand how to score and evaluate.

Use of Statistics

As mentioned, the CRS can use existing statistical and mathematical methods to display the ratings from the evaluations. The use of statistics and mathematics can be decided by the administrators, and they are free to choose whatever methods they feel will give them a competitive advantage and that make sense for their industry. In some cases, administrators can make the information as complex as possible and provide this information for experts or for other with a high degree of knowledge in their industry. In other ways, some administrators may select to only use very select and simple information and display it in such a way that is easy for everyone to understand in order to appeal to a wider audience.

In Regards to Time

The CRS has flexibility with regards to the use of time in conducting the evaluations, publishing them, and the length of time in which reviews are valid. There are several ways in which the administrators can adapt the CRS to its needs in order to keep the environment competitive, keep their customers and clients engaged, and to adapt to their specific industry.

For example, for products such as books, the evaluations would be more static and not change over time. Therefore, evaluations for a book from registered reviewers will not change. However, the administrator can select to pool data for like books for when they were published, and compare their reviews.

For clients whose product or service may change over time, such as restaurants, the administrator may elect to offer reviews to its customers that are current for a set period of time (i.e. every fiscal quarter or every month). The administrator can optimize the CRS to show customers the most recent information based on a set period of time, thus giving customer the most up to date look at a product or service that is relevant in the present. This can also be a useful tool to monetize the CRS for the administrator, as they can charge clients per quarter for new reviews, instead of a one-time charge for reviews.

The administrators can use the consideration of time in any way they see fit for their industry, however it must comply statistically and show ratings that are in line with the CRS concept and that is a balance between convenience for the clients, simplicity of display for the customer, and make logical business sense for the administrator.

Queue

Registered reviewers can have a queue or work pending in the CRS so that the division of work is better managed. This queue directly ties into the randomization of assigning reviewers a specific business or product to review. Generally, registered reviewers and other administrators of the system will be able to see how many are in the queue. Only higher level administrators will have access to see what specific clients the registered reviewer has in their queue. But in all cases, no one will have access to manipulate the order or specific reviews in a registered reviewers queue.

The CRS has options for a separate queue for orders waiting to be given to registered reviewers. This will allow the administrators to monetize the reviews by allowing companies to get to the front of the line or considered a priority. But once the order for a review goes into a registered reviewers' individual queue, no one will have access to see who has that specific review.

The administrators have the option to include a minimum and cap to the amount of reviews a registered reviewer can have in their queue. The maximum can be adjusted based on the industry and what is practical for the registered reviewer to complete in a reasonable amount of time.

Verification of Evaluations

It is recommended that the administrators put a verification process in place to ensure that the registered reviewer actually experience the product or service. This process will be unique for every industry and will be up to them to figure out the most optimal way for verifying. For example, if an administrator used the CRS for evaluating restaurants, the administrator may require the registered reviewer to show their receipt for the meal they purchased, check in on social media when they arrive at the restaurant, take photos of their meal, etc.

Compensation of Reviewers

The CRS is created to be a sustainable business model for administrators whose main business is presenting information about products or services. Industry users or administrators have the ability to charge clients for set amounts of reviews. The purpose of the CRS business method (from a monetary perspective), is to provide businesses a cost effective way to promote their products or services. It is highly recommended that administrators create prices for evaluations that are affordable for small and large businesses in order to give them all a fair chance to compete against one another, while also generating enough revenue that will be profitable for the administrator that employs the CRS.

Additionally, in one embodiment, they can also compensate the registered reviewers for conducting their evaluations. Compensation can be direct through payment, or it can be by reimbursement for part or all of what the registered reviewer paid to experience the business, service, or product. This will be different based on the industry and product, however it is highly recommended that industry users and administrators seek out registered reviewers who are not motivated by compensation. This will ensure that administrators will find evaluators who are motivated by higher means, such as helping their community and providing honest information for the benefit of small businesses, and will be less likely to accept a bribe or try and manipulate the system to their own advantage.

Review Minimums and Maximums

As noted, there must be a minimum of three reviews for a product or service in order for the ratings to be displayed to the public. As there is a minimum amount of reviews a client can purchase, there also must be a set maximum. This maximum must comply with the rule of thirds within the CRS. The maximum will vary from industry to industry, but there are several reasons for this. One, creating a maximum amount of reviews a client can purchase will keep the level of reviews that need to be verified to a reasonable amount, thereby not overwhelming the administrator or its reviewers with backlogged work. This will allow them to deliver the ratings to clients within a reasonable amount of time. Two, creating a 'ceiling' of reviews will increase the perceived value of each review in their respective marketplace. Capping the supply of reviews as demand for them rises will help administrators increase the dollar value of the information and turn a higher profit. Three, at a particular point, the amount of reviews that a client receives will not alter or change their ratings in any significant manner. This eliminates the perception that a company can 'buy' their way into a better rating by purchasing more. Additionally, keeping the range of review amounts close among all clients creates the perception of a more 'fair' environment to the consumer, as all companies receive a similar amount of reviews.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A method for generating and providing one or more evaluations to a consumer to aid in a decision making process, the method comprising:
receiving, from a requesting client, evaluation request data associated with evaluation of at least one of a product, performance, or service provided by the requesting client to a consumer;
selecting a set of registered reviewers to review the at least one product, performance or service based on the evaluation request data and one or more characteristics of the registered reviewers in the set of registered reviewers;
transmitting an evaluation request to the set of registered reviewers;
receiving evaluation data from the set of registered reviewers based on one or more evaluations completed by the set of registered reviewers;
analyzing the evaluation data to thereby generate an overall review of the product, performance, or service; and
providing the overall review of the product, performance, or service to a consumer to thereby assist the consumer in making a decision associated with the evaluated product, performance, or service.

2. The method of claim 1, wherein the evaluation request data is selected from the group consisting of: identity of a requesting client; identity of the product, performance, or service to be evaluated, evaluation parameters; timeframe for release of overall review of the product, performance, or service; and a combination of at least two thereof.

3. The method of claim 2, wherein the evaluation parameters are selected from the group consisting of: number of reviewers in the set of reviewers; characteristics of at least one reviewer in the set of reviewers; specialty of at least one reviewer in the set of reviewers; experience level of at least one reviewer in the set of reviewers; and a combination of at least two thereof.

4. The method of claim 1, wherein transmitting an evaluation notification comprises providing a cumulative evaluation form to the set of reviewers, the cumulative evaluation form eliciting evaluation input data from each reviewer of the set of the reviewers.

5. The method of claim 4, wherein the evaluation input data is selected from the group consisting of: a numerical score of the product, performance, or service in one or more evaluation categories; a written opinion of the product, performance, or service in one or more evaluation categories; and a combination thereof.

6. The method of claim 4, wherein analyzing the evaluation data comprises comparing input data from at least two reviewers of the set of reviewers and generating the overall review of the product, performance, or service based on the comparison.

7. The method of claim 1, wherein the overall review of the product, performance, or service comprises a numerical score representative of a ranking of the evaluated product, performance, or service relative to other similar evaluated products, performances, or services.

8. The method of claim 1, further comprising selecting the set of reviewers based on at least one characteristic of the reviewers.

9. The method of claim 1, further comprising verifying authenticity and objectivity of evaluation data prior to analyzing the evaluation data and providing the overall review of the product, performance, or service to a consumer.

10. The method of claim 1, further comprising limiting a number of evaluation requests that are available to a client for requesting for the product, performance or service.

11. A system for generating and providing one or more evaluations to a consumer to aid in a decision making process, the system comprising:
an internet-based computing system configured to communicate and exchange data with at least one of a system host, one or more administrators, one or more clients requesting evaluation of at least one of a product, performance, or service, one or more registered reviewers, and one or more consumers, the internet-based computing system comprising a cumulative evaluation computing system, including a processor, configured to:
- receive evaluation request data from a requesting client, the evaluation request data associated with evaluation of at least one of a product, performance, or service provided by the requesting client to a consumer;
- select a set of registered reviewers to review the at least one product, performance or service based on the evaluation request data and one or more characteristics of the registered reviewers in the set of registered reviewers;
- transmit an evaluation request to the set of registered reviewers;
- receive evaluation data from the set of registered reviewers based on one or more evaluations completed by the set of registered reviewers;
- analyze the evaluation data to thereby generate an overall review of the product, performance, or service; and
- provide the overall review of the product, performance, or service to the one or more consumer to thereby assist the one or more consumers in making a decision associated with the evaluated product, performance, or service.

12. The system of claim 11, wherein the evaluation request data is selected from the group consisting of: identity of a requesting client; identity of the product, performance, or service to be evaluated, evaluation parameters; timeframe for release of overall review of the product, performance, or service; and a combination of at least two thereof.

13. The system of claim 12, wherein the evaluation parameters are selected from the group consisting of: number of reviewers in the set of reviewers; characteristics of at least one reviewer in the set of reviewers; specialty of at least one reviewer in the set of reviewers; experience level of at least one reviewer in the set of reviewers; and a combination of at least two thereof.

14. The system of claim 11, wherein cumulative evaluation computing system is configured to provide a cumulative evaluation form to the set of reviewers, the cumulative evaluation form eliciting evaluation input data from each reviewer of the set of the reviewers.

15. The system of claim 14, wherein the evaluation input data is selected from the group consisting of: a numerical score of the product, performance, or service in one or more evaluation categories; a written opinion of the product, performance, or service in one or more evaluation categories; and a combination thereof.

16. The system of claim 14, wherein the cumulative evaluation computing system is configured to compare input data from at least two reviewers of the set of reviewers and generate the overall review of the product, performance, or service based on the comparison.

17. The system of claim 11, wherein the overall review of the product, performance, or service comprises a numerical score representative of a ranking of the evaluated product, performance, or service relative to other similar evaluated products, performances, or services.

18. The system of claim 17, wherein the set of reviewers is selected based on at least one characteristic of the reviewers.

19. The system of claim 11, wherein the cumulative evaluation computing system is configured to verify authenticity and objectivity of evaluation data prior to analyzing the evaluation data and providing the overall review of the product, performance, or service to a consumer.

20. The system of claim 11, wherein a number of evaluation requests that are available for a client to request for the product, performance or service is limited.

* * * * *